(12) United States Patent
Yamawaki

(10) Patent No.: US 7,292,668 B2
(45) Date of Patent: Nov. 6, 2007

(54) DATA PROCESSOR AND DATA PROCESSING METHOD

(75) Inventor: Masashi Yamawaki, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 556 days.

(21) Appl. No.: 09/841,077

(22) Filed: Apr. 25, 2001

(65) Prior Publication Data

US 2002/0069390 A1    Jun. 6, 2002

(30) Foreign Application Priority Data

Dec. 5, 2000  (JP) .............................. 2000-370275

(51) Int. Cl.
*H04L 7/06* (2006.01)
(52) U.S. Cl. ...................... 375/364; 375/365; 375/368; 375/355; 714/798; 370/503; 370/509; 370/514
(58) Field of Classification Search ................ 370/503, 370/510, 509, 514; 375/354, 355, 365, 368, 375/364, 510, 514, 503; 714/798
See application file for complete search history.

(56) References Cited

U.S. PATENT DOCUMENTS 5,631,783 A * 5/1997 Park ............................ 360/51
6,118,603 A * 9/2000 Wilson et al. ................ 360/48

* cited by examiner

*Primary Examiner*—Temesghen Ghebretinsae
*Assistant Examiner*—Juan Alberto Torres
(74) *Attorney, Agent, or Firm*—Arent Fox LLP

(57) ABSTRACT

In a data processor, a pickup head reads the data from a memory medium. Such data transferred in a plurality of parallel bits in synchronization with the clock signal to a controller unit from a read channel unit. The controller unit detects the predetermined mark for detecting synchronization included in the data in order to establish the synchronization of a series of data to be received from the read channel unit in order to demodulate the data other than the predetermined mark for detecting synchronization. The mark detecting unit in the controller unit detects the predetermined mark for detecting synchronization from the parallel data received with the shift register.

17 Claims, 19 Drawing Sheets

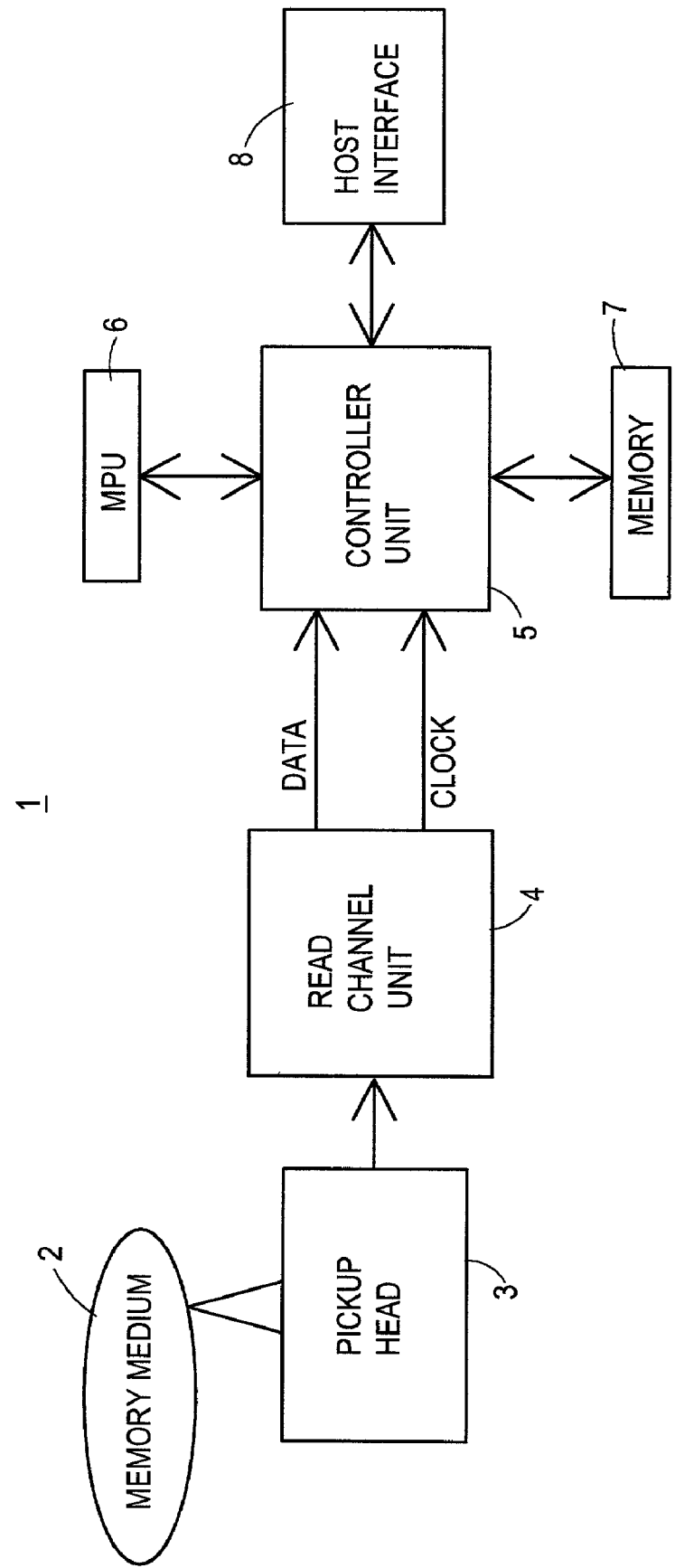
FIG.1 SYSTEM STRUCTURE DIAGRAM OF THE PRESENT INVENTION

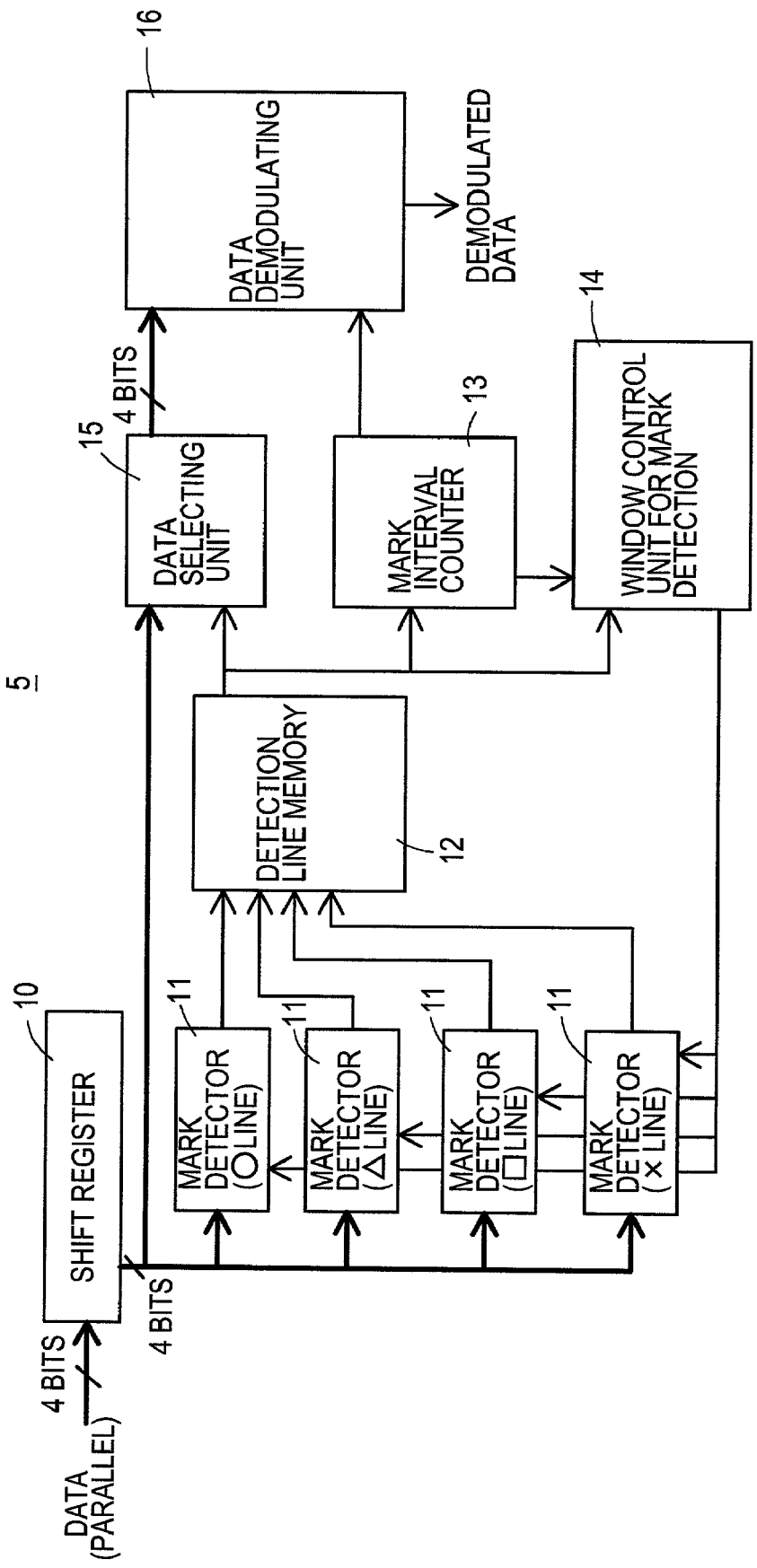
FIG.2 BLOCK DIAGRAM ILLUSTRATING A BASIC STRUCTURE OF CONTROLLER UNIT

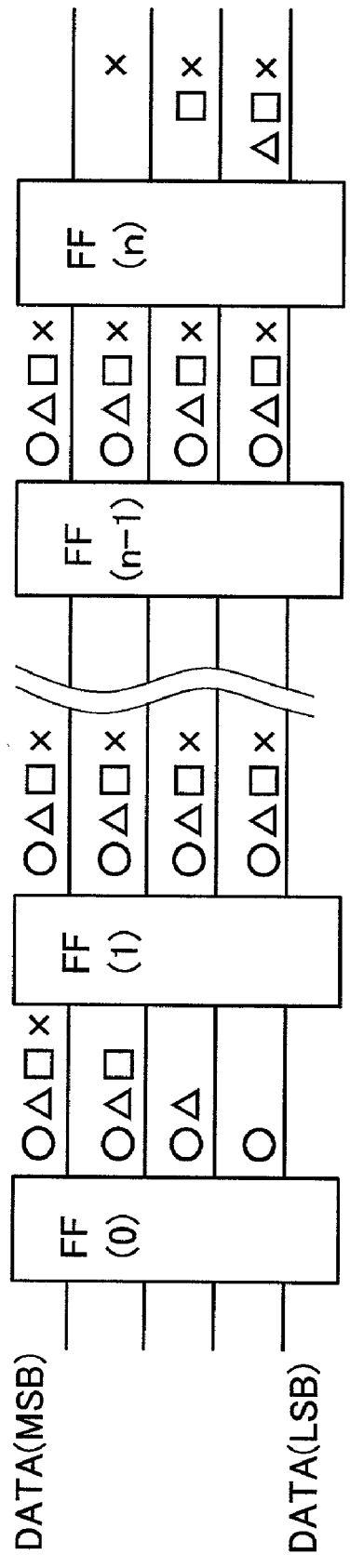
FIG.3 EXPLANATORY DIAGRAM FOR DATA DISTRIBUTION IN PARALLEL TRANSFER OF FOUR BITS

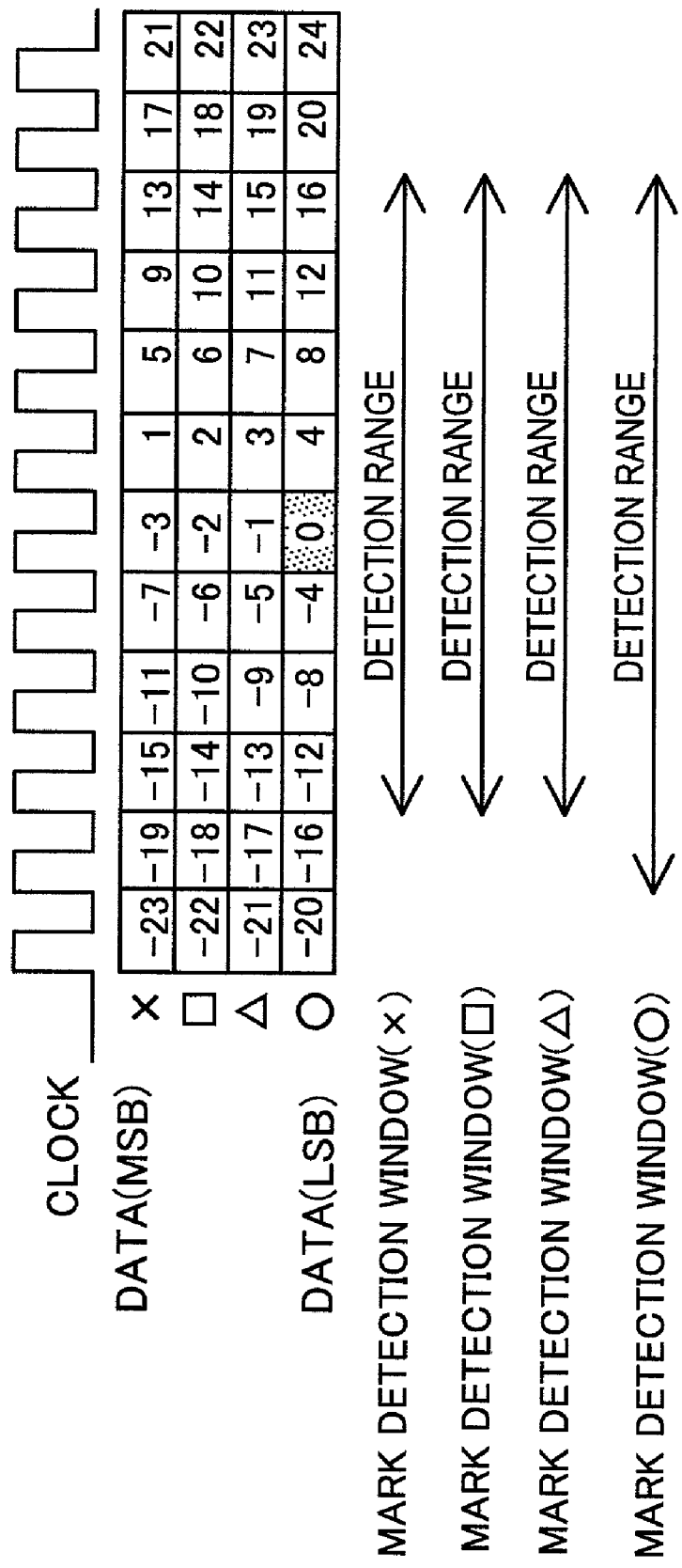
FIG.4 EXPLANATORY DIAGRAM FOR GENERATION OF MARK DETECTION WINDOW WHEN PREDETERMINED MARKS FOR DETECTING SYNCHRONIZATION ARE DETECTED IN THE ○ - LINE AT THE TIME OF TRANSFERRING THE DATA IN THE PARALLEL CONDITION OF FOUR BITS

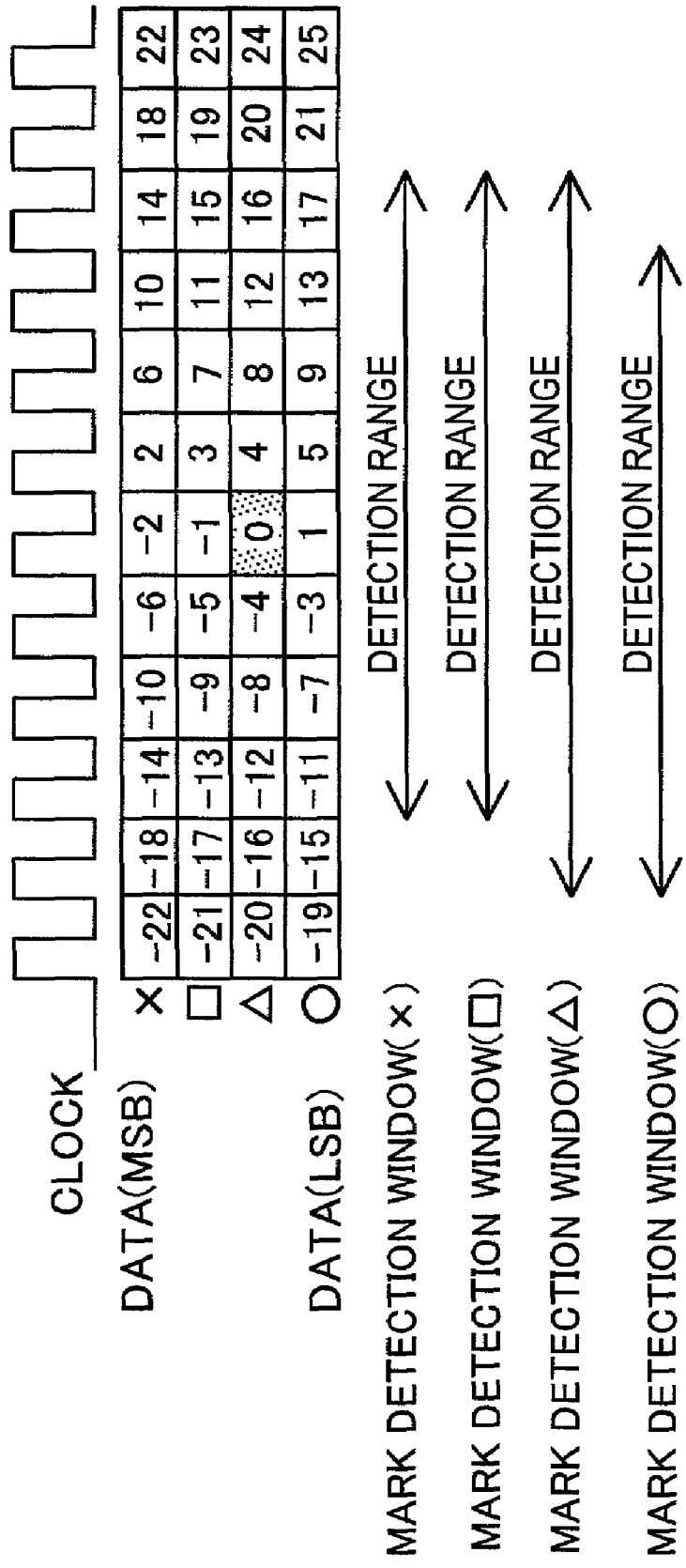
FIG.5 EXPLANATORY DIAGRAM FOR GENERATION OF MARK DETECTION WINDOW WHEN PREDETERMINED MARKS FOR DETECTING SYNCHRONIZATION ARE DETECTED IN THE △ - LINE AT THE TIME OF TRANSFERRING THE DATA IN THE PARALLEL CONDITION OF FOUR BITS

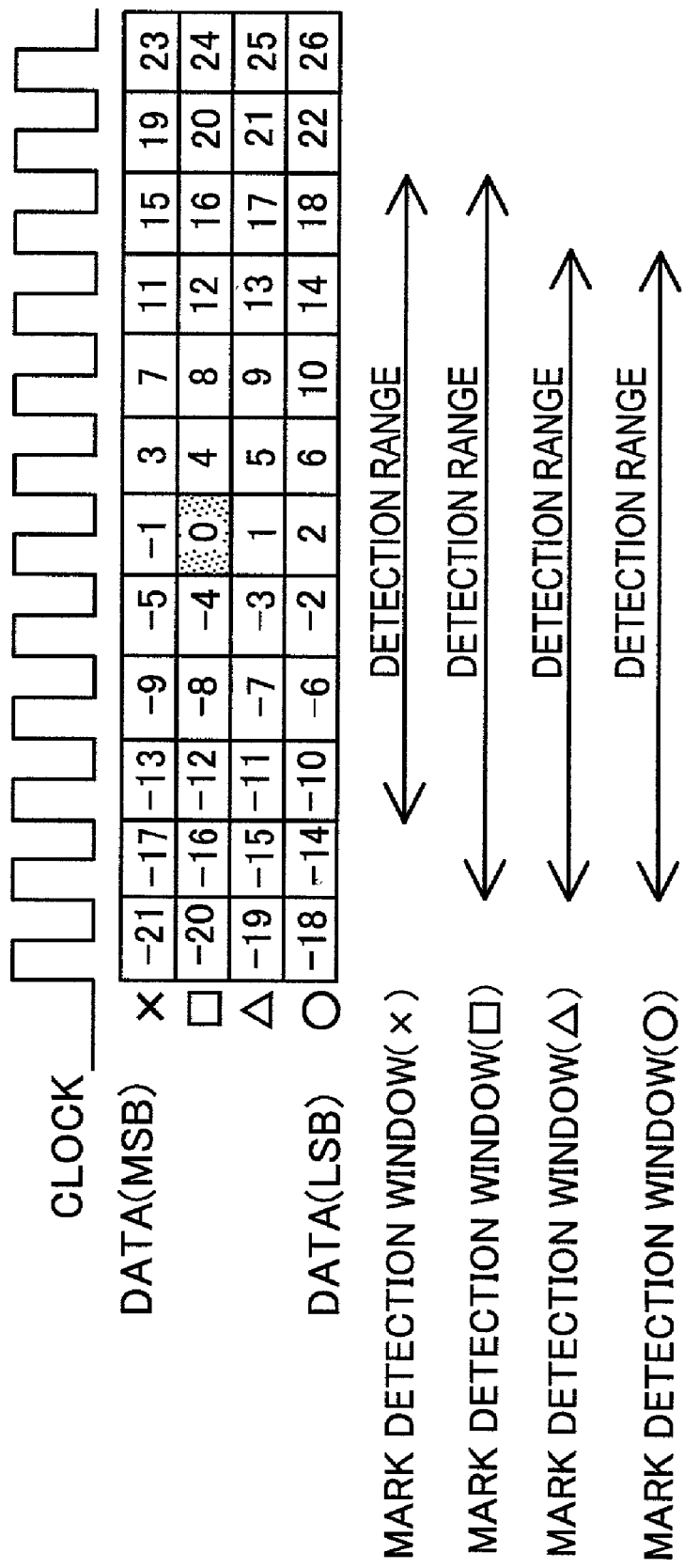
FIG.6 EXPLANATORY DIAGRAM FOR GENERATION OF MARK DETECTION WINDOW WHEN PREDETERMINED MARKS FOR DETECTING SYNCHRONIZATION ARE DETECTED IN THE □ — LINE AT THE TIME OF TRANSFERRING THE DATA IN THE PARALLEL CONDITION OF FOUR BITS

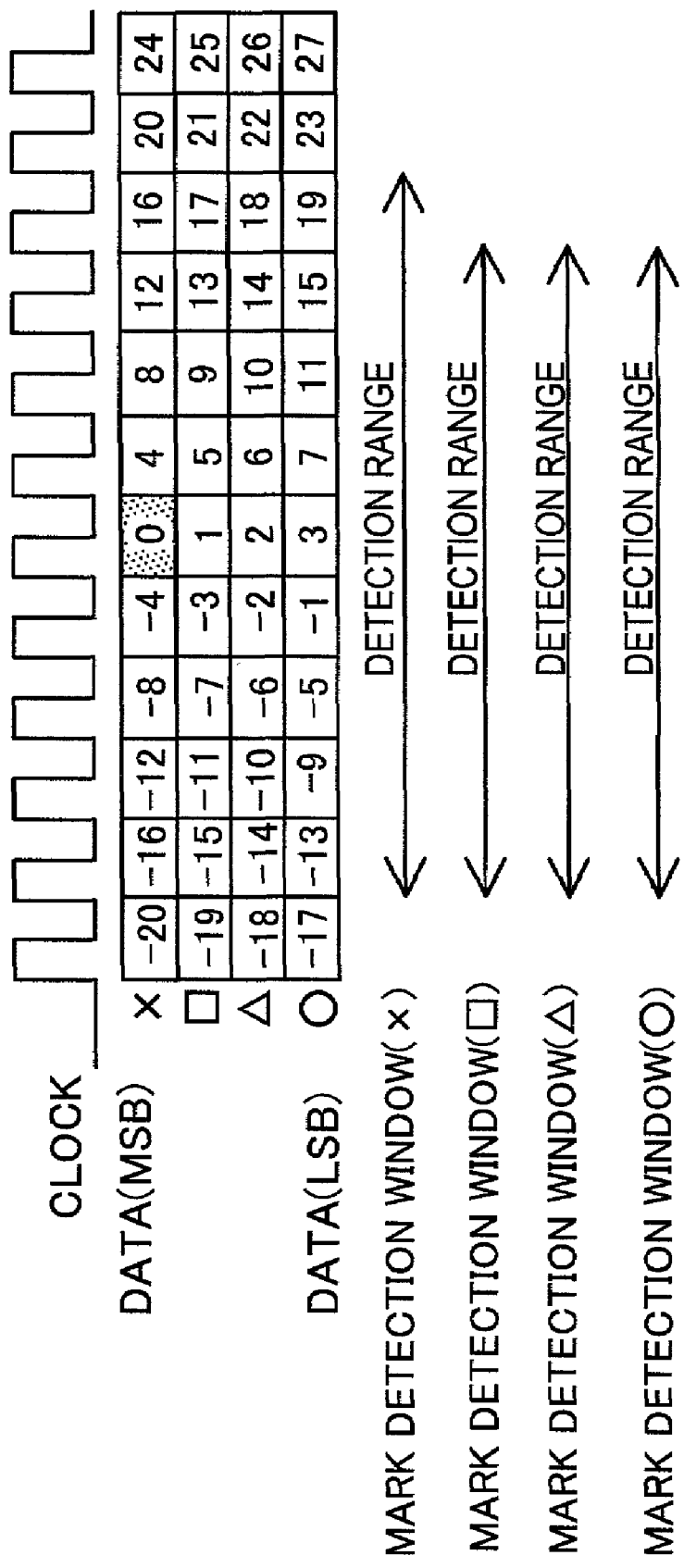
FIG.7 EXPLANATORY DIAGRAM FOR GENERATION OF MARK DETECTION WINDOW WHEN PREDETERMINED MARKS FOR DETECTING SYNCHRONIZATION ARE DETECTED IN THE x-LINE AT THE TIME OF TRANSFERRING THE DATA IN THE PARALLEL CONDITION OF FOUR BITS

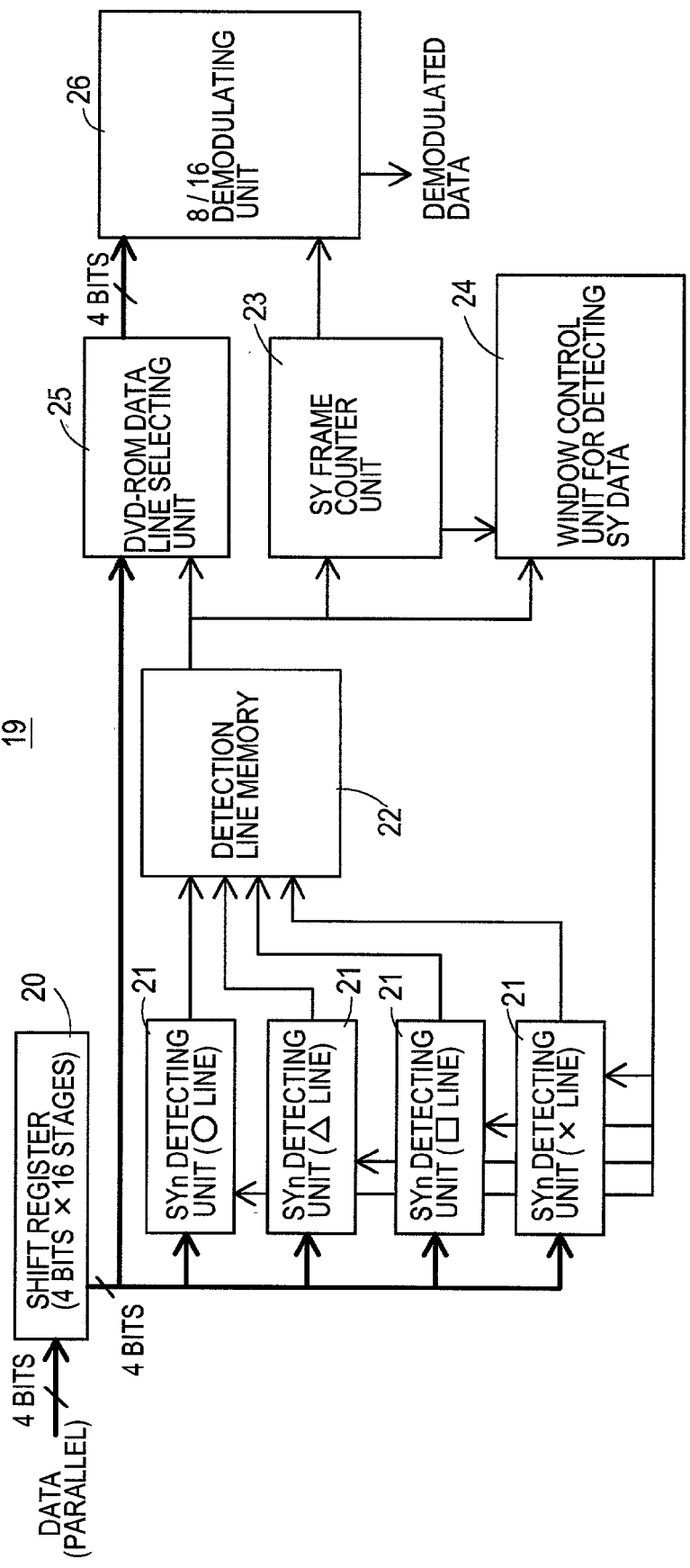
FIG.8 BLOCK DIAGRAM ILLUSTRATING BASIC STRUCTURE OF CONTROLLER UNIT OF DATA PROCESSOR WHEN A DVD-ROM IS USED

FIG.9

DIAGRAM ILLUSTRATING A DATA FORMAT OF A DVD - ROM IN DATA PROCESSOR USING THE DVD - ROM

| SY0 | DATA 91BYTE | SY5 | DATA 91BYTE |
|-----|-------------|-----|-------------|
| SY1 | DATA 91BYTE | SY5 | DATA 91BYTE |
| SY2 | DATA 91BYTE | SY5 | DATA 91BYTE |
| SY3 | DATA 91BYTE | SY5 | DATA 91BYTE |
| SY4 | DATA 91BYTE | SY5 | DATA 91BYTE |
| SY1 | DATA 91BYTE | SY6 | DATA 91BYTE |
| SY2 | DATA 91BYTE | SY6 | DATA 91BYTE |
| SY3 | DATA 91BYTE | SY6 | DATA 91BYTE |
| SY4 | DATA 91BYTE | SY6 | DATA 91BYTE |
| SY1 | DATA 91BYTE | SY7 | DATA 91BYTE |
| SY2 | DATA 91BYTE | SY7 | DATA 91BYTE |
| SY3 | DATA 91BYTE | SY7 | DATA 91BYTE |
| SY4 | DATA 91BYTE | SY7 | DATA 91BYTE |

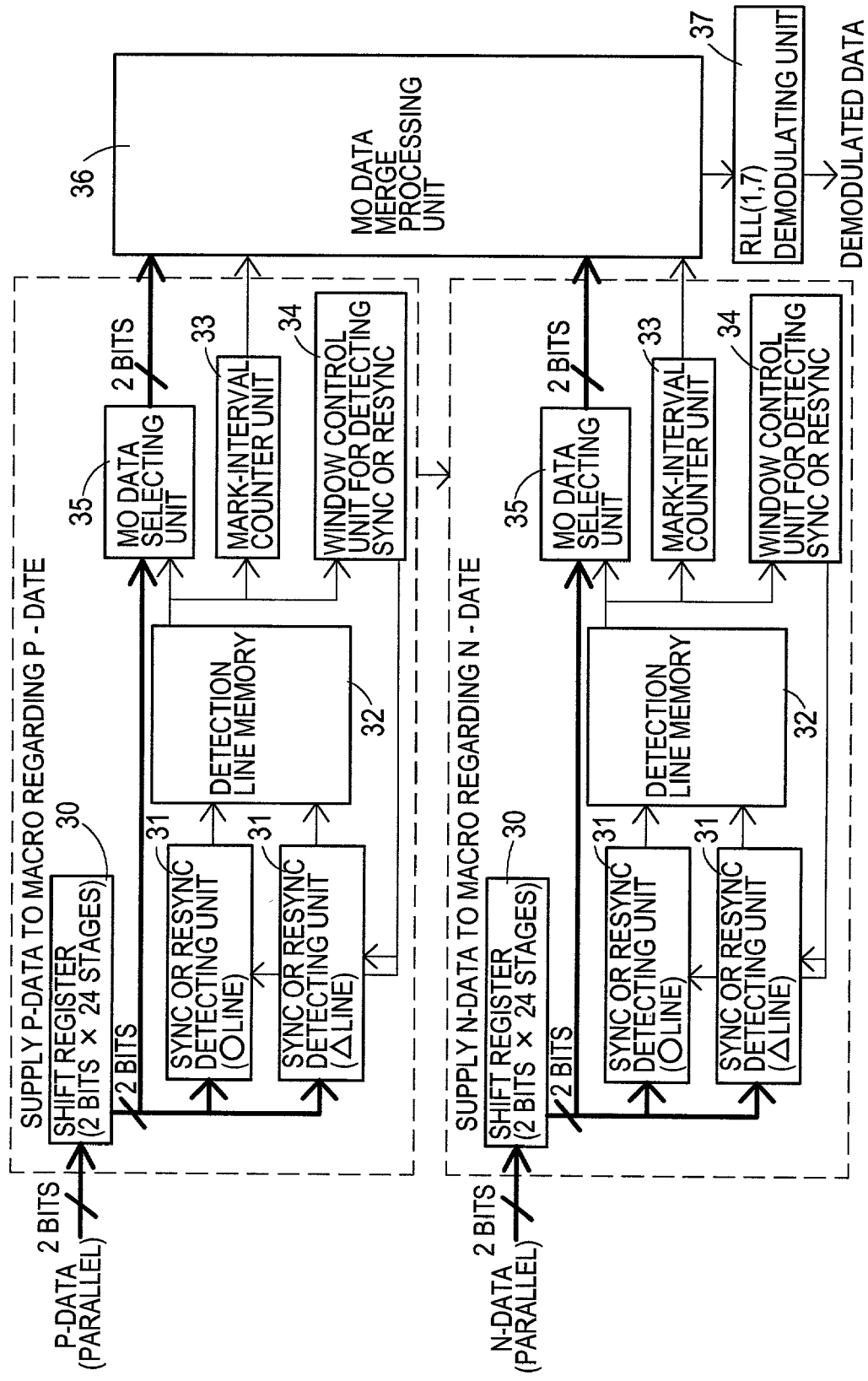

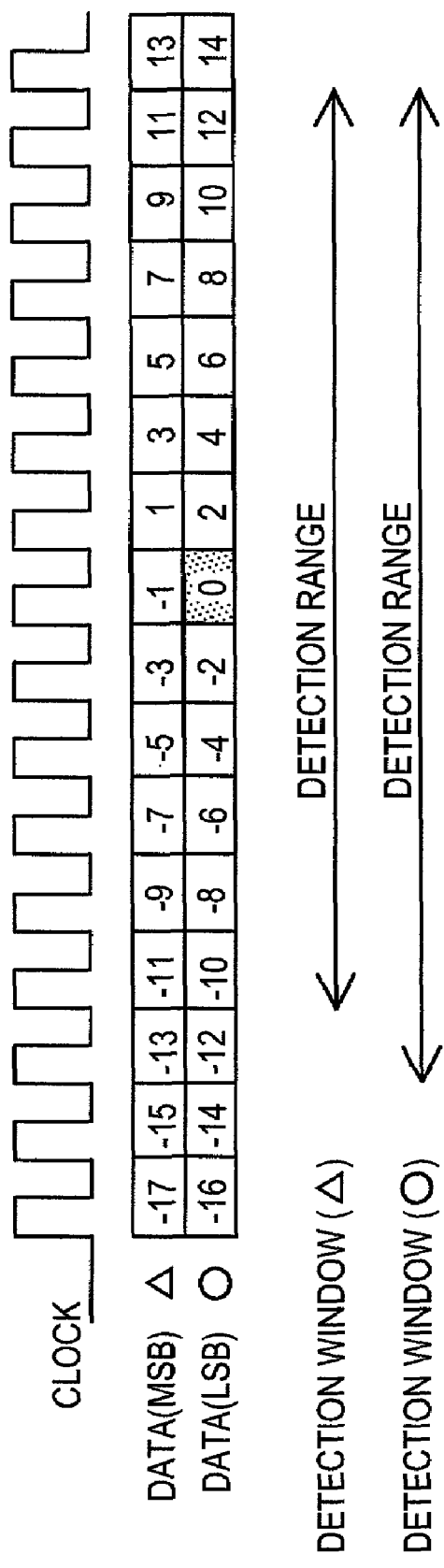

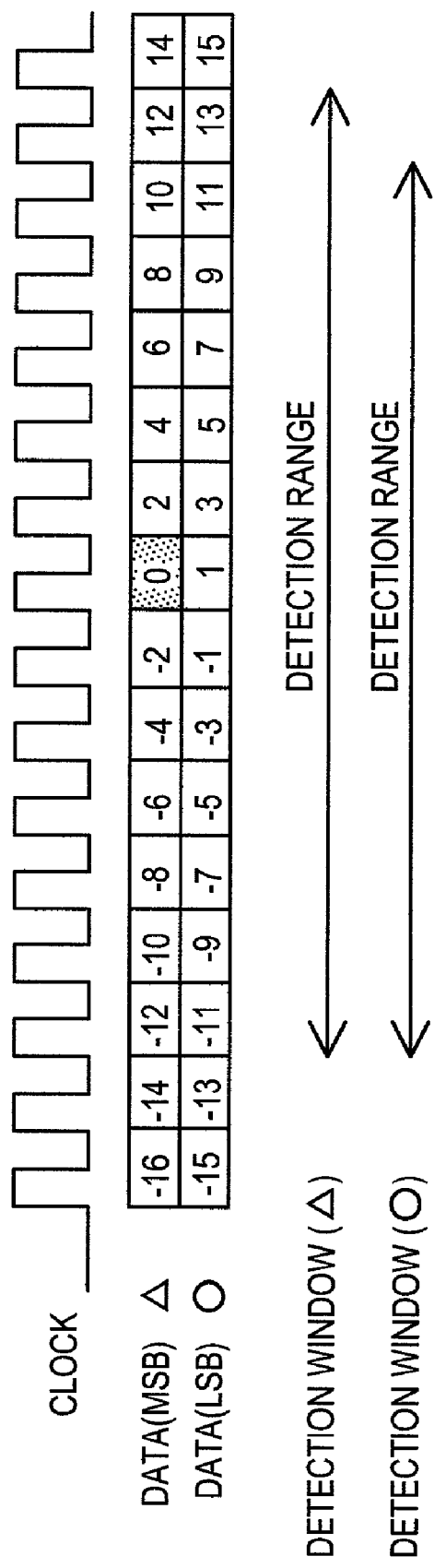

FIG.14

DIAGRAM ILLUSTRATING A DATA FORMAT OF DATA PROCESSOR WHEN AN MO IS USED

| SYNC | DATA 20BYTE | RESYNC | DATA 20BYTE |
|---|---|---|---|
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |
| RESYNC | DATA 20BYTE | RESYNC | DATA 20BYTE |

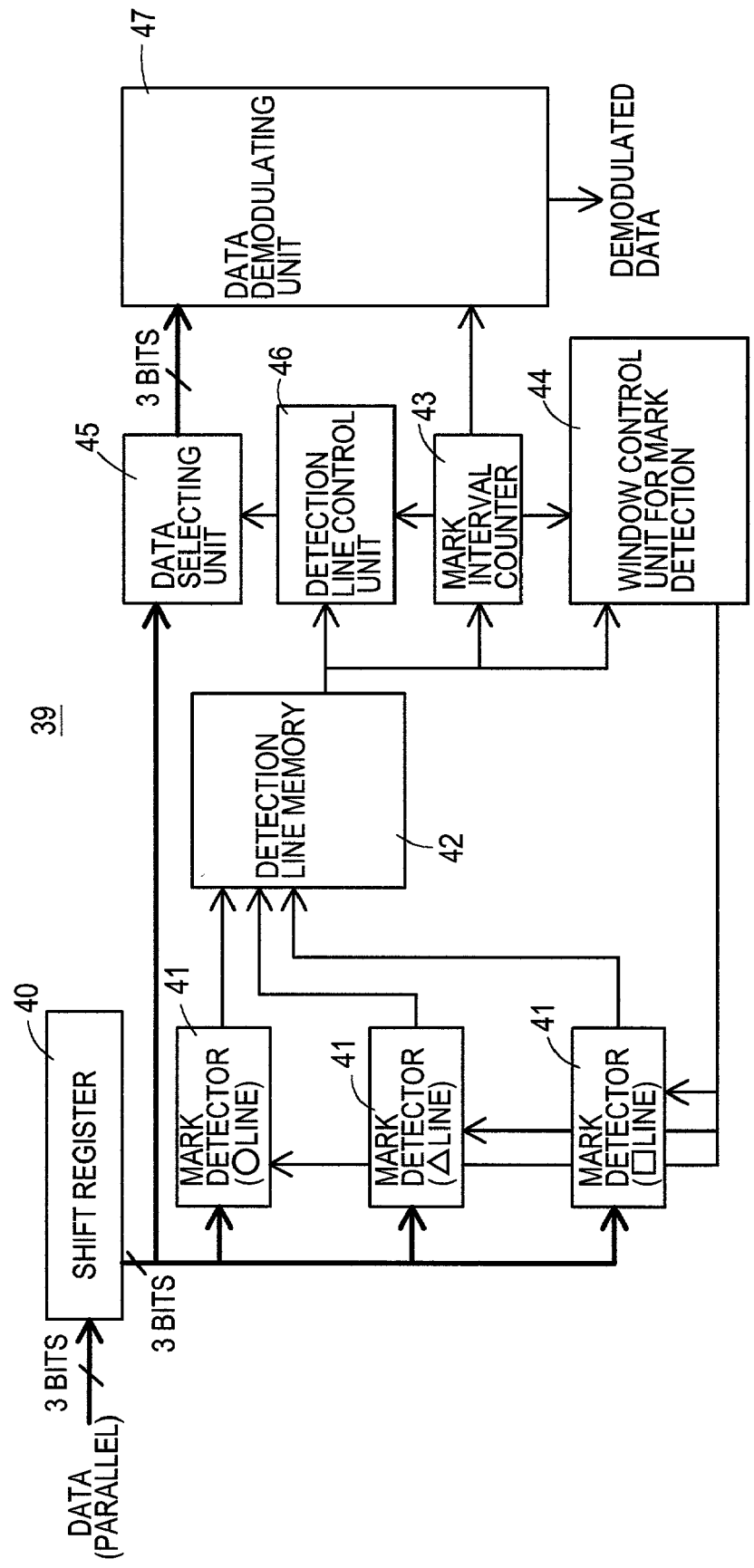
FIG. 15 SYSTEM STRUCTURE DIAGRAM ILLUSTRATING THE BASIC STRUCTURE OF CONTROLLER UNIT OF DATA PROCESSOR OF OTHER EMBODIMENT

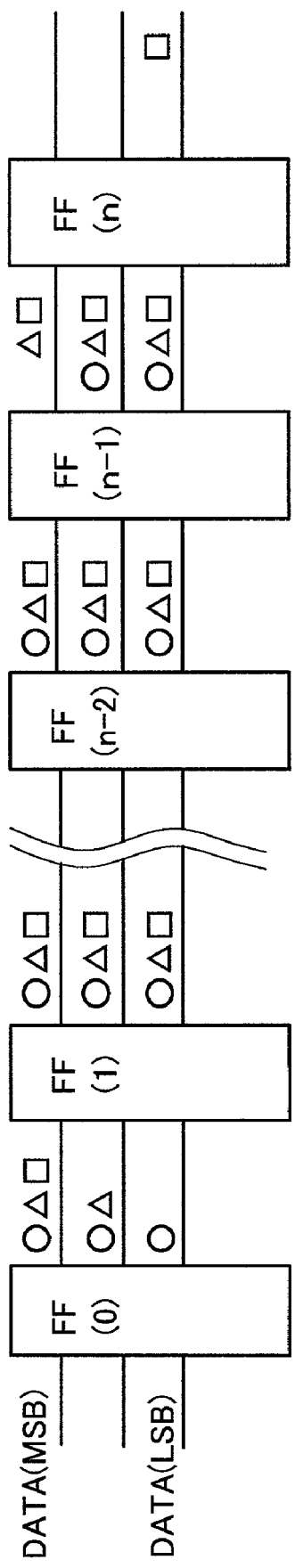
FIG.16 EXPLANATORY DIAGRAM FOR DISTRIBUTION OF DATA IN PARALLEL CONDITION OF THREE BITS STRUCTURAL DIAGRAM ILLUSTRATING DATA PROCESSOR FOR READING DATA FROM A MEMORY MEDIUM OF RELATED ART DIAGRAM ILLUSTRATING A STRUCTURE IN CONTROLLER OF RELATED ART FOR PROCESSING THE SERIAL DATA TRANSFERRED FROM READ CHANNEL UNIT DIAGRAM ILLUSTRATING A STRUCTURE IN CONTROLLER OF RELATED ART (IN PARALLEL CONDITION)

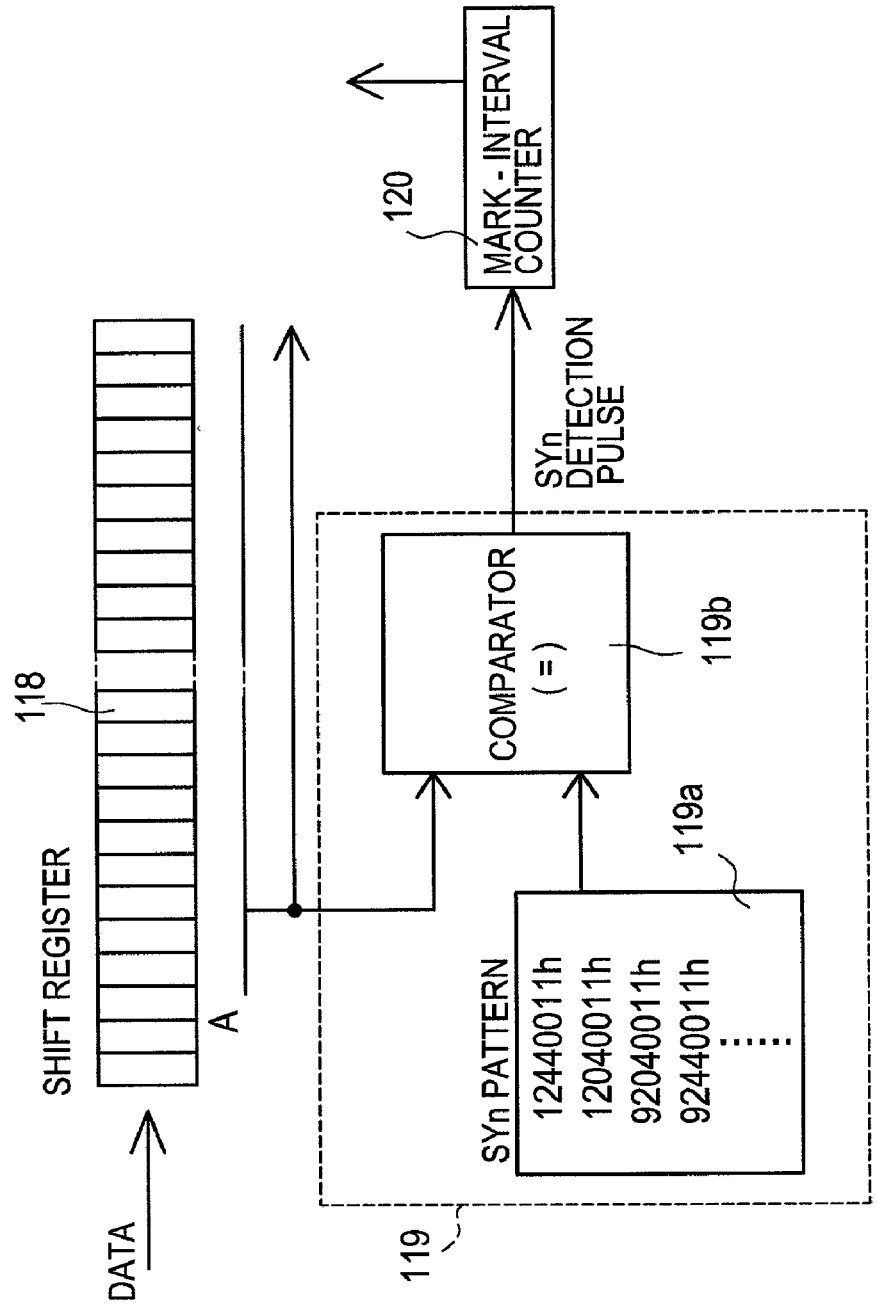
FIG.20 EXPLANATORY DIAGRAM FOR A METHOD TO DETECT A PATTERN OF PREDETERMINED MARKS IN DATA PROCESSOR OF RELATED ART USING A DVD - ROM

DATA PROCESSOR AND DATA PROCESSING METHOD

BACKGROUND OF THE INVENTION

1. Field of the Invention

The present invention relates to a data processor and data processing method for detecting a predetermined mark for synchronous detection included in data and demodulating the data in order to establish the synchronization of a series of the receiving data and particularly to such processor and processing method to execute processes for the data read from various memory media, for example, such as the digital versatile disc (DVD) read only memory (hereinafter referred to as DVD-ROM) and magneto-optical disc (MO) or the like

2. Description of the Related Art

There is provided, for example, a data processor to read (or write) the data from (or to) various kinds of memory media such as DVD or the like. This data processor is provided with a read channel unit and a controller unit to reproduce (or record) the data synchronously with the reference clock signal under the condition that the disc is revolved at the constant number of revolutions as a memory medium. This read channel unit inputs the data read via a read head and also transfers such data to the controller unit.

In these years, on the occasion of transferring the data to the controller unit from this read channel unit, high speed bit rate is required for transferring such data. For example, when it is required to process the data read from a DVD-ROM, the transfer bit rate of about 105 (Mbit/sec) is required in the case of the four-fold data transfer mode. Such a high speed data process is essential for realization of high speed functions of such data processor but, on the other hand, reduction of power consumption is also required because power consumption becomes higher with realization of high speed data processes.

As an example, it is assumed that a pickup head 102 reads the data from a memory medium 101 illustrated in FIG. 17. The data read out from the medium is transferred in synchronization with the clock signal to an LSI 104 for controller as a controller unit from and LSI 103 for read channel as the read channel unit and this data is then processed within an LSI 104 for controller.

Moreover, a controller unit 105 of the data processor as the related art illustrated in FIG. 18 is provided to process the serial data transferred from the read channel unit. The controller unit 105 is provided with a shift register 106, a mark detector 107, a mark-interval counter 108 and a data demodulator 109 which are operating synchronously with the input clock. When the shift register 106 inputs the data in the serial type, the mark detector 107 detects a predetermined mark (for example, data SYn for synchronous signal) to establish the synchronization of data and the mark-interval counter 108 counts the data existing in the interval between the predetermined marks based on the detected predetermined marks. The data demodulator 109 demodulates the data at the demodulation timing based on the counted data.

As illustrated in FIG. 17, in the case where the LSI 103 for read channel and the LSI 104 for controller are formed with individual chips, when the serial data is transferred, for example, in the higher transfer bit rate of 105 (Mbit/sec) to the LSI 104 for controller, a trouble such as data change due to noise or the like is easily generated. Therefore, it is preferable to reduce as much as possible the transfer bit rate between the LSI 103 for read channel and LSI 104 for controller in order to prevent generation of such trouble.

In view of overcoming such trouble, a certain method has been employed to set the condition that the LSI 103 for read channel can transfer the data in a plurality of bit widths in the parallel condition and such preset data can be transferred simultaneously in the parallel condition to the LSI 104 for controller. For example, when the data is transferred simultaneously in the parallel condition with the two-bit width at the time of transferring the serial data in the bit rate of 105 (Mbit/sec), the frequency of clock signal is reduced to a half, namely to 52.5 (MHz) from 105 (MHz). Therefore, the technique to simultaneously transfer the data in the parallel condition with the width of a plurality of bits between the LSI 103 for read channel and LSI 104 for controller is effective for reduction of frequency of the clock signal.

Here, a related art example of the controller unit for processing in parallel the data transferred from the read channel unit will be illustrated in FIG. 19. As illustrated in FIG. 19. the controller unit 110 is provided with a PLL (Phase Locked Loop) circuit 111 for doubling the clock signal synchronized with the data and moreover is also provided with a parallel/serial converting unit 112 for converting the parallel data transferred from the read channel to the serial data, moreover, with addition of the shift register 113, mark detector 114, mark-interval counter 115 and date demodulator 116.

In this case, the PLL circuit 111 doubles the input clock signal and then inputs the data to the shift register 113 after the parallel/serial converting unit 112 that is operating synchronously with the doubled clock signal returns the data to the serial data of the initial condition. The mark detector 114 detects the predetermined mark from the serial data in the shift register 113 and the mark-interval counter 115 counts up the data between the predetermined marks based on the detected predetermined marks. The data demodulator 116 demodulates the data in the demodulation timing based on the counted data.

Here, the predetermined mark detecting method will be explained with reference to FIG. 20. For example, DVD-ROM is used as a memory medium and the data processor illustrated in FIG. 20 detects a pattern of the predetermined marks (data SYn for synchronous signal).

In more practical, the mark detector 119 in the data processor is provided with a memory 119a and a comparator 119b. The memory 119a stores patterns (for example, 12440011h, 12040011h, 92040011h, 92440011h, etc.) of the predetermined marks (data SYn for synchronous signal). The comparator 119b detects whether there is a pattern matched with the pattern (for example, 12440011h or the like) of the predetermined marks (data SYn for synchronous signal) or not from the data inputted to the shift register 118. When it is detected with the comparator 119b that there is a pattern matched with the pattern of the predetermined marks (data SYn for synchronous signal), the comparator 119b outputs a detection signal indicating existence of the predetermined marks (data SYn for synchronous signal) to the mark-interval counter 120.

The mark-interval counter 120 is preset in the timing (namely, in the timing where the detection signal of the data SYn for synchronization signal outputted from the comparator 119b becomes 1) for detecting a pattern of the predetermined marks (data SYn for synchronous data). It is because the mark-interval counter 120 operates with the clock synchronized with the data and requires the timing for detecting the predetermined marks (data SYn for synchronous signal) to measure the data demodulation timing at the time of conducting the count-down from the preset value.

When a method of detecting the predetermined marks is introduced to the controller unit 110 of FIG. 19, there exists a merit that the existing mark detector 114 for synchronous detection, mark-interval counter 115 and data demodulator 116, etc. (refer to FIG. 19) can be used in direct. On the contrary, there exists a demerit, in the case of the controller unit 110, that the PLL circuit 111 for multiplying the clock signal and the parallel/serial converting unit 112 for returning the parallel data to the serial data are newly required in order to process the data simultaneously transferred in the parallel condition with the width of a plurality of bits during operation synchronously with the multiplied clock signal. In the case where the PLL circuit 111 is used, power consumption increases with multiplication of the clock signal, not responding to the requirement for reduction of power consumption.

In the case where the LSI 103 for read channel and LSI 104 for controller illustrated in FIG. 17 are used, if only the process of data is considered, the frequency of the clock signal of the transfer bit rate can be raised up to 400 (MHz) from the existing frequency of about 105 (MHz). However, when the frequency of 400 (MHz) is used, the data synchronizing circuit and demodulating circuit may be designed in the reasonable size of the circuit structure, but these circuits are operated in such frequency, it is rather probable that the power consumption which increases in proportion to the operation rate is considerably shared on the circuit operation.

Moreover, even when the frequency limit is set to about 400 (MHz), here rises a problem that it is impossible to satisfy the requirement of a user for further higher operation rate.

SUMMARY OF THE INVENTION

The present invention has been disclosed to solve the problems of the related art and therefore it is an object of the present invention to provide a data processor and a data processing method that can enhance the data processing ability through reduction of power consumption.

In view of achieving the object explained above, according to one aspect of the present invention, a receiving unit for receiving the data in a plurality of bits of the parallel condition and a detecting unit for detecting the predetermined mark for synchronous detection to establish the synchronization of the data from the parallel data are comprised and the data between the predetermined marks for detecting synchronization can be demodulated.

According to this invention, a large amount of data can be processed without reduction of the data transfer bit rate by processing in parallel the data. Particularly when the paralleled data in a plurality of bits (for example, two bits) are simultaneously transferred as a data transfer method to transfer the data read from the memory medium to the controller from the read channel, the data processing capability can be acquired while keeping the lower transfer clock frequency and the power consumption can also be lowered because it is not required to use the multiplied clock signal. Therefore, according to this invention, the data processing capability can further be enhanced as required, while lowering the power consumption as much as possible.

In more detail, for the parallel process of the data transferred from the read channel unit, the PLL circuit (refer to FIG. 19) described in the item of the Description of the Related Art is necessary and moreover a parallel/serial converting unit for converting the parallel data to the serial data has been required. However, it is preferable not to use, if possible, the PLL circuit for multiplying the clock signal from the reason in the point of view of lowering the power consumption. Therefore, even when the data including the predetermined mark for synchronous detection is received in the parallel condition, it is required to consider the circuit design not using the PLL circuit and parallel/serial converting circuit and it has been the important point to be considered for creation of the present invention.

Even in the case of the data processor newly introducing the structure that the data paralleled in the condition of a plurality of bits are simultaneously inputted, if a constant bit deviation is generated, the data re-synchronization is required. Therefore, it is also required to detect the predetermined marks for detecting synchronization in the data.

From the viewpoint explained above, the inventor of the present invention have found the invention to demodulate the data between the predetermined marks for detecting synchronization detected by providing a detecting unit for detecting the predetermined marks for detecting synchronization from the paralleled data received to further increase the amount of data process while reducing as much as possible the power consumption.

Moreover, the detecting unit preferably detects the predetermined marks for detecting synchronization with a predetermined bit width in a series of data received in the parallel condition.

As explained above, the detecting unit detects the predetermined marks for detecting synchronization with a predetermined bit width in a series of data received in the parallel condition and thereby surely detects the data when the predetermined marks for detecting synchronization have a predetermined bit width.

Moreover, it is also preferable to provide a generation timing selecting unit for selecting the generation timing of the predetermined mark detection window based on the predetermined marks for detecting synchronization.

As explained above, the generation timing selecting unit selects the generation timing of the predetermined mark detection window based on the detected predetermined marks for detecting synchronization and therefore it can generate the predetermined mark detection window in the adequate timing for detecting the next predetermined mark for synchronous detection after the detection of the predetermined marks for detecting synchronization.

Moreover, the data processor is also preferable to comprise a data demodulating unit for demodulating the data based on the predetermined marks for detecting synchronization.

Thereby, since the detecting unit detects the predetermined marks for detecting synchronization to establish the synchronization of data from the received data in the parallel condition, the data demodulating unit can demodulate the data between the predetermined marks for detecting synchronization based on the predetermined marks for synchronous detection detected in a predetermined bit width.

In addition, the data processor is also preferable to further comprise a detection line memory unit for storing the detection line based on the predetermined marks for detecting synchronization.

Thereby, since the detecting unit detects the predetermined marks for detecting synchronization to establish the synchronization of data from the received data in the parallel condition and the detection line memory unit stores the detection line based on the detected predetermined marks for detecting synchronization, those to be detected can be known previously at the time of detecting the next predetermined marks for detecting synchronization after detection of the predetermined marks for detecting synchronization and thereby the predetermined marks for detecting synchronization can be detected easily.

Moreover, the data processor is further preferable to comprise a data selecting unit for selecting the data based on the predetermined marks for detecting synchronization.

Thereby, the detecting unit detects the predetermined marks for detecting synchronization to establish the synchronization of data from the received data in the parallel condition and the data selecting unit selectively demodulates the data between the predetermined marks for detecting synchronization.

The above and further objects and novel features of the invention will more fully appear from the following detailed description when the same is read in connection with the accompanying drawings. It is to be expressly understood, however, that the drawings are purpose of illustration only and not intended as a definition of the limits of the invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 1 is a system structure diagram illustrating a basic structure of a data processor of the preferred embodiments of the present invention;

FIG. 2 is a block diagram illustrating a basic structure of a controller unit of the data processor of the embodiment;

FIG. 3 is an explanatory diagram for data distribution in parallel transfer of four bits in the embodiment;

FIG. 4 is an explanatory diagram for generation of mark detection window when the predetermined marks for detecting synchronization are detected in the ○-line at the time of transferring the data in the parallel condition of four bits in this embodiment;

FIG. 5 is an explanatory diagram for generation of the mark detection window when the predetermined marks for detecting synchronization are detected in the Δ-line at the time of transferring the data in the parallel condition of four bits in this embodiment;

FIG. 6 is an explanatory diagram for generation of the mark detection window when the predetermined marks for detecting synchronization are detected in the □-line at the time of transferring the data in the parallel condition of four bits in this embodiment;

FIG. 7 is an explanatory diagram for generation of the mark detection window when the predetermined marks for detecting synchronization are detected in the X-line at the time of transferring the data in the parallel condition of four bits in this embodiment;

FIG. 8 is a block diagram illustrating the basic structure of the controller unit of the data processor when a DVD-ROM is used as the other embodiment;

FIG. 9 is a diagram illustrating a data format of a DVD-ROM in the data processor using the DVD-ROM;

FIG. 10 is a block diagram illustrating the basic structure of the controller unit of the data processor when an MO is used as the other embodiment;

FIG. 12 is an explanatory diagram for generation of the mark detection window when the predetermined marks for detecting synchronization are detected in the ○-line at the time of transferring the data in the parallel condition of two bits in this embodiment;

FIG. 13 is an explanatory diagram for generation of the mark detection window when the predetermined marks for detecting synchronization are generated in the Δ-line at the time of transferring the data in the parallel condition of two bits in this embodiment;

FIG. 14 is a diagram illustrating a data format of the data processor when an MO is used;

FIG. 15 is a system structure diagram illustrating the basic structure of the controller unit of the data processor of the other embodiment;

FIG. 16 is an explanatory diagram for distribution of data in the parallel condition of three bits in this embodiment;

FIG. 20 is an explanatory diagram for a method to detect a pattern of the predetermined marks in the data processor of the related art using a DVD-ROM.

DETAILED DESCRIPTION OF THE PREFERRED EMBODIMENTS

Figure 11:
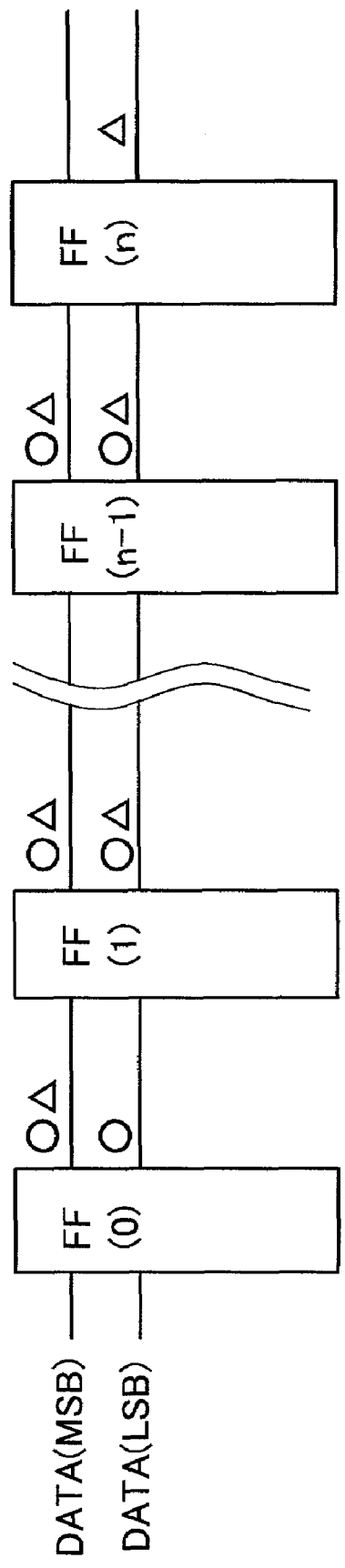
FIG. 11 is an explanatory diagram for distribution of the data in the parallel condition of two bits in this embodiment.
Figure 17:
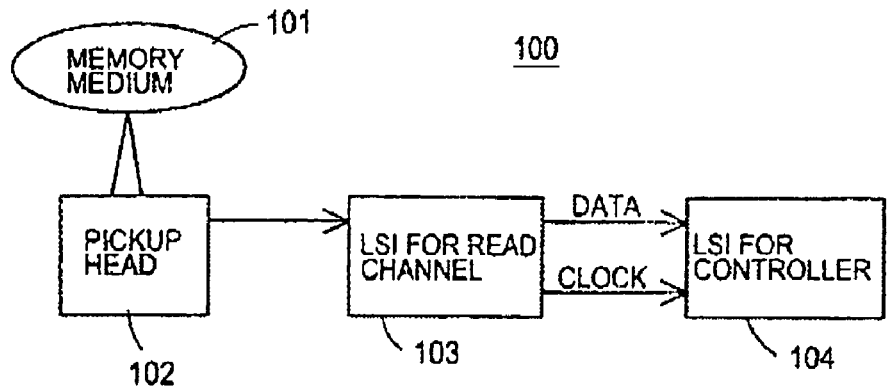
FIG. 17 is a structural diagram illustrating the data processor for reading data from a memory medium of the related art.

An embodiment embodying a data processor of the present invention to read (or write) data from (or to) a memory medium will be explained in detail with reference to the accompanying drawings.

FIG. 1 is a system structure diagram illustrating the basic structure of a data processor of an embodiment embodying the present invention.

A data processor 1 comprises, as illustrated in FIG. 1, a memory medium 2, a pickup head 3, a read channel unit 4, a controller unit 5 as a receiving unit, a microprocessor unit (MPU) 6, a memory 7 and a host interface 8.

As this memory medium 2, for example, a DVD-ROM, or a magneto-optical disc (MO) or the like may be used preferably. On these discs, the predetermined marks for detecting synchronization (for example, data SYn for synchronous detection) are recorded in addition to the data including the audio data or video data or the like. The pickup head 3 reads the data from the memory medium 2, processes such data and thereafter outputs the processed data to the read channel unit 4. The read channel unit 4 transfers, under the condition synchronized with the clock signal, the data (for example, predetermined marks for detecting synchronization and the audio or video data existing between such predetermined marks) to the controller unit 5 in a plurality of bits of the parallel condition. The microprocessor unit 6 transfers the data to the host interface 8 by controlling the controller unit 5 or the like with use of the memory 7.

Figure 19:
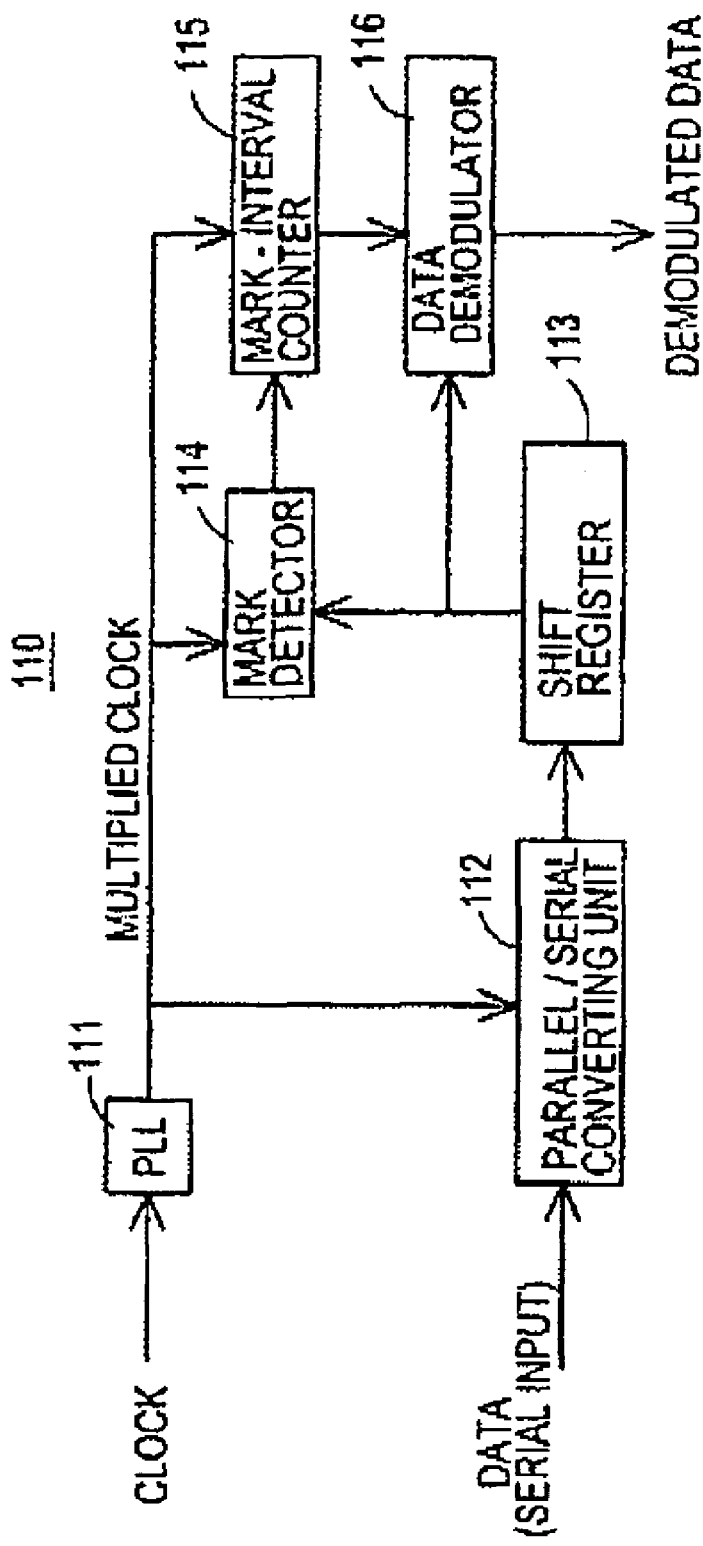
FIG. 19 is a diagram illustrating a structure in the controller of the related art for processing, in the parallel condition, the data transferred from the read channel unit.

Here, it is preferable to process in parallel (not in serial) the data transferred from the read channel unit 4 in order to realize high speed demodulation for the series of audio data or video data other than the predetermined mark for detecting synchronization during detection of the predetermined mark for synchronous detection without lowering of the transfer bit of the data transferred from the read channel unit 4. However, in the case of the parallel data transfer method to the controller unit 5 from the read channel unit 4, if the predetermined mark for detecting synchronization cannot be detected on the parallel condition for the paralleled data, the PLL circuit 111 and the parallel/serial converting unit 112 to return the parallel data to the serial data as illustrated in FIG. 19 are required as a result, not fulfilling the requirement for reduction of power consumption.

However, in the case of this embodiment, since the parallel input is enabled with direct use (multiplication with the PLL circuit or the like is not required) of the clock synchronized with the input data, high speed data transfer may be realized in the multiple of the number of parallel bits and power consumption can also be suppressed in comparison with the serial data transfer.

In practical, the controller unit 5 of the data processor 1 illustrated in FIG. 2 processes the parallel data transferred from the read channel unit 4. This controller unit 5 is provided with a shift register 10, four mark detectors 11 as the detecting unit, a detection line memory 12 as the detection line storing unit, a mark-interval counter 13 as the data counting unit, a window control unit 14 for mark detection as a generation timing selecting unit, a data selecting unit 15 as the data selecting unit and a data demodulating unit 16 as the data demodulating unit. To the shift register 10, mark detecting unit 11, detection line memory 12, mark-interval counter 13, mark detection window control unit 14, data selecting unit 15 and data demodulating unit 16, the clock signal is respectively applied. Thereby, these circuits or units can operate synchronously with the clock signal.

In detail, the shift resister 10 is connected with the mark detecting unit 11 and data selecting unit 15. The parallel data of four bits outputted from the shift register 10 are respectively inputted to the four mark detecting units 11 and data selecting unit 15. The four mark detecting unit 11 are provided to respectively detect the data of each bit of the predetermined mark for detecting synchronization in the parallel data of four bits in order to detect the predetermined mark for detecting synchronization in any type of the ○-lines/Δ-lines/□-lines/X-lines (refer to FIG. 3) that will be explained later. In this case, a mark of ○/Δ/□/X shows content of one bit in the data.

The four mark detecting units 11 are connected with the detection line memory 12. An output signal of the mark detecting unit 11 is then inputted to the detection line memory 12. The detection line memory 12 stores whether what predetermined mark for detecting synchronization exists in the parallel data of four bits, namely stores that any type of detection line exists among the ○-lines/Δ-lines/□-lines/X-lines (refer to FIG. 3). Since the detection line memory 12 stores the detection line of the predetermined mark for detecting synchronization, the window control unit 14 for mark detection can previously detect the type of the ○-lines/Δ-lines/□-lines/X-lines to be detected on the occasion of detecting the next predetermined mark for detecting synchronization after detection of the predetermined mark for detecting synchronization. The detection line memory 12 is connected to the mark-interval counter 13, window control unit 14 for mark detection and data selecting unit 15. An output signal of the detection line memory 12 is then inputted respectively to the mark-interval counter 13, window control unit 14 for mark detection and data selecting unit 15.

The mark-interval counter 13 counts the audio data or video data existing between two predetermined marks for detecting synchronization. This mark-interval counter 13 can estimate the positions of the predetermined marks for detecting synchronization appearing after the audio data or video data after detection of the predetermined mark for detecting synchronization. Moreover, the mark-interval counter 13 is connected with the window control unit 14 for mark detection and data demodulating unit 16. An output of the mark-interval counter 13 is respectively inputted to the window control unit 14 for mark detection and data demodulating unit 16.

The window control unit 14 for mark detection opens the detection window in the mark detecting unit 11 to control the operation for detecting the predetermined mark for detecting synchronization. The window control unit 14 for mark detection selects the generation timing of the window for detecting predetermined mark based on the predetermined mark for detecting synchronization stored in the detecting line memory 12. Therefore, the window control unit 14 for mark detection is connected to four mark detecting units 11. An output signal of the window control unit 14 for detection is respectively inputted to four mark detecting units 11. A partitioning area between the predetermined marks for detecting synchronization and audio data or video data can be discriminated by detecting the predetermined mark for detecting synchronization in any of the four mark detecting units 11 when the four mark detecting unit 11 detect the predetermined mark for detecting synchronization.

The data selecting unit 15 is provided to select the audio data or video data or the line based on the operation to detect predetermined mark for detecting synchronization. The data demodulating unit 16 selectively processes the four-bit parallel data outputted from the shift register 10. Therefore, the data selecting unit 15 is connected with the data demodulating unit 16 to input an output signal from the data selecting unit 15 to the data demodulating unit 16. The data demodulating unit 16 demodulates the data in the demodulation timing based on the audio data or video data counted with the mark-interval counter 13 under the operation of the data selecting unit 15.

The shift register 10 is provided with the storing units of 16 stages in the width of four bits to store the data of 64 bits in total. The shift register 10 sequentially inputs the parallel data of four bits from the read channel unit 4. In the case where the data is shifted in synchronization with the clock within the shift register 10, the input audio data or video data is also shifted in addition to the predetermined mark for detecting synchronization to be inputted to establish the synchronization of data.

The shift register 10 has a structure, as illustrated in FIG. 3, connecting in series 16 flip-flop circuits of four bits FF(0) to FF(n) (in this case, n is 15). The four data transfer lines are individually connected between the serially connected two flip-flop circuits FF(n−1) and FF(n). Thereby, the data inputted to and stored in the flip-flop FF(0) can be inputted to the next flip-flop FF(1) in the input timing of the next synchronous signal. In the same manner as above, the data inputted to and stored in the flip-flop FF(n−1) is then inputted to the next flip-flop FF(n) in the input timing of the next synchronous signal.

In this case, the data of MSB of the flip-flop FF(0) can be inputted to MSB of the next flip-flop FF(1) in the input timing of the synchronous signal. The data of LSB of the flip-flop FF(0) can also be inputted to LSB of the next flip-flop FF(1). The data other than date of MSB and LSB of the flip-flop FF(0) is also inputted to the next flip-flop FF(1).

Thereby, in the case where the data for predetermined mark for detecting synchronization is an integer times of four (4) (for example, 32 bits), as illustrated in FIG. 3, when the data for predetermined mark for detecting synchronization is stored to allocate four circles (○) in the flip-flop FF(0) of four bits, the data for predetermined mark for detecting synchronization is stored to allocate four circles, even in the flip-flop FF(1) to flip-flop FF(n−1) (n is 8 when the data for predetermined mark for detecting synchronization is, for example, 32 bits). In this case, the circle (○) of the data for predetermined mark for detecting synchronization is allocated in the form of 32 circles and this allocation is called the ○-line.

However, when the data Δ for predetermined mark for detecting synchronization is stored to allocate in the form of three data toward LSB from MSB in the flip-flop FF(0) of four bits, data is stored to allocate in the form of four data Δ even for the flip-flop FF(1) to FF(n−1) (n is eight(8)) when the data for predetermined mark for detecting synchronization is, for example, 32 bits). However, the flip-flop FF(n) (n is eight(8)) stores only one data Δ for predetermined mark for detecting synchronization in its LSB. In this case, the data for predetermined mark for detecting synchronization is allocated in the form of 32 data and this allocation is called the Δ-line.

In the same manner, when the data □ for predetermined mark for detecting synchronization is stored to allocated in the form of two data toward LSB from MSB in the flip-flop FF(0) of four bits, the data □ is stored to allocate in the form of four data even for the flip-flop FF(1) to flip-flop FF(n−1) (n is eight (8) when the data for predetermined marks for detecting synchronization is, for example, 32 bits). However, the flip-flop FF(n) (n is eight) stores two data □ for predetermined marks for detecting synchronization toward MSB from LSB. In this case, since 32 data □ for predetermined marks for detecting synchronization are allocated and this allocation is called the □-line.

Moreover, when the flip-flop FF(0) of four bits store, in its MSB, only one data X for predetermined mark for detecting synchronization, the data is also stored to allocate in the form of four data Δ, even for the flip-flop FF(1) to flip-flop FF(n−1) (n is eight, when the data for predetermined mark for detecting synchronization is, for example, 32 bits). However, in the flip-flop FF(n) (n is eight), the data X for predetermined marks for detecting synchronization is stored to allocate in the form of three data. In this case, the data X for predetermined mark for detecting synchronization is stored to allocate in the form of 32 data and this allocation is called the X-line.

Moreover, since the four mark detecting units 11 are respectively connected to the output terminal of the shift register 10, the mark detecting unit 11 inputs, from the flip-flop FF(0) to flip-flop FF(n) of four bits in the shift register 10 of FIG. 2, the predetermined marks for detecting synchronization (for example, data for predetermined marks for detecting synchronization SYn or the like) under the condition being synchronized with the clock. The four mark detecting units 11 can detect the predetermined mark for detecting synchronization should be inputted in which type of the ○-line/Δ-line/□-line/X-line (refer to FIG. 3) in the parallel data of four bits.

In this case, it is very significant that the predetermined mark for detecting synchronization in the parallel data can be detected from any bit position of parallel data.

Regarding this point, as illustrated in FIG. 2, since the mark detecting units 11 provided as many as the number of bits of parallel data can discriminate all of the four types (○-line/Δ-line/□-line/X-line) when the parallel data is inputted in synchronization with the clock from the shift register 10 of FIG. 3, the predetermined mark for detecting synchronization can be detected even if the data is inputted in any condition. The reason why it is necessary to detect the predetermined mark for detecting synchronization is to detect the predetermined mark for detecting synchronization from any bit position of the parallel data in the case of reading the data from the memory medium 2 and moreover to realize the re-synchronization of data by detecting the predetermined mark for detecting synchronization even when the constant bit deviation is generated.

Moreover, in order to prevent erroneous detection of predetermined mark for detecting synchronization, the window control unit 14 for mark detection opens the detection window only at the part where the predetermined mark for detecting synchronization is assumed to exist for the mark detecting unit 11. In this case, the window control unit 14 for mark detection controls the detection window at the mark detecting unit 11 to equally open only 16 bits in the former and latter portions. As explained above, since the mark detecting unit 11 detects the predetermined mark for detecting synchronization in a predetermined bit width (each 16 bits in the former and latter portions) in a series of data received in the parallel condition, these marks can surely be detected when the predetermined mark for detecting synchronization exists as many as a predetermined bit width.

In this case, since the detection line memory 12 stores which mark detecting unit 11 (○-line/Δ-line/□-line/X-line) among four mark detecting units 11 has detected the predetermined marks for detecting synchronization, the window control unit 14 for mark detection selects, based on the stored detection line, the generation timing of the window for detecting the predetermined marks for detecting synchronization.

Namely, when the mark detecting unit 11 has detected the predetermined marks for detecting synchronization in the type of ○-line, the window control unit 14 for mark detection selects the generation timing of FIG. 4 to prepare for generating the next mark detection window of only former 16 bits and latter 16 bits (32 bits in total) of a predetermined bit "0" (refer to ○ (LSB) of FIG. 4). The numerals written in the frame of FIG. 4 to FIG. 7 indicate the bit width, because when the predetermined mark for detecting synchronization is detected in the type of ○-line, the next predetermined mark for detecting synchronization must be detected at the position of a predetermined bit "0" when data deviation is not generated.

In more practical, when the predetermined mark for detecting synchronization is detected in the type of ○-line, as the selection of generation timing, as illustrated in FIG. 4, the mark detection window opens, for detection of the ○-line, to detect the heading mark of the predetermined marks for detecting synchronization with the bits "−16", "−12", "−8", "−4", "0", "4", "8", "12" and "16". Moreover, the mark detection window opens, for detection of the Δ-line, to detect the heading mark of the predetermined marks for detecting synchronization with the bits "−13", "−9", "−5", "−1", "3", "7", "11" and "15". Moreover, for detection of the □-line, the mark detection window opens to detect the heading mark of the predetermined marks for detecting synchronization with the bits "−14", "−10", "−6", "−2", "2", "6", "10" and "14". In addition, the mark detection window opens, for detection of the X-line, to detect the heading mark of the predetermined marks for detecting synchronization with the bits "−15", "−11", "−7", "−3", "1", "5", "9" and "13".

Moreover, when the mark detecting unit 11 detects the predetermined mark for detecting synchronization in the type of Δ-line, the window control unit 14 for mark detection selects the generation timing of FIG. 5 to prepare for generation of the next mark detection window only for the former 16 bits and latter 16 bits (32 bits in total) at the center of a predetermined bit "0" (refer to Δ of FIG. 5), because when the predetermined mark for detecting synchronization is detected in the type of Δ-line, the next predetermined mark for detecting synchronization must be detected at the position of a predetermined bit "0" if the data deviation is not generated.

In more practical, when the predetermined mark for detecting synchronization is detected in the type of Δ-line, as the selection of generation timing, as illustrated in FIG. 5, the window for mark detection opens, for detection of the ○-line, to detect the heading mark of the predetermined mark for detection of synchronization with the bits "−15", "−11", "−7", "−3", "1", "5", "9" and "13". Moreover, for detection of the Δ-line, the window for mark detection opens to detect the heading mark of the predetermined mark for detecting synchronization with the bits "−16", "−12", "−8", "−4", "0", "4", "8", "12" and "16". Moreover, for detection of the □-line, the window for mark detection opens to detect the heading mark of the predetermined mark for detecting synchronization with the bits "−13", "−9", "−5", "−1", "3", "7", "11" and "15". Moreover, for detection of the X-line, the window for mark detection opens to detect the heading mark of the predetermined mark for detecting synchronization with the bits "−14", "−10", "−6", "−2", "2", "6", "10" and "14".

In addition, when the mark detecting unit 11 detects the predetermined mark for detecting synchronization in the type of □-line, the window control unit 14 for mark detection selects the generation timing in FIG. 6 to prepare for generation of only former 16 bits and latter 16 bits (32 bits in total) around a predetermined bit "0", (refer to □ in FIG. 6) of the next window for mark detection, because the next predetermined mark for detecting synchronization must be detected at the position of a predetermined bit "0" if data deviation is not generated.

In more practical, when the predetermined mark for detecting synchronization is detected in the type of □-line, as the selection of generation timing, the window for mark detection opens, for detection of the ○-line, as illustrated in FIG. 6, to detect the heading mark of the predetermined mark for detecting synchronization with the bits "−14", "−10", "−6", "−2", "2", "6", "10" and "14". Moreover, for detection of the Δ-line, the window for mark detection opens to detect the heading mark of the predetermined mark for detecting synchronization with the bits "−15", "−11", "−7", "−3", "1", "5", "9" and "13". Moreover, for detection of the □-line, the window for mark detection opens to detect the heading mark of the predetermined mark for detecting synchronization with the bits "−16", "−12", "−8", "−4", "0", "4", "8", "12" and "16". Moreover, for detection of the X-line, the window for mark detection opens to detect the heading mark of the predetermined mark for detecting synchronization with the bits "−13", "−9", "−5", "−1", "7", "11" and "15".

In addition, when the mark detecting unit 11 detects the predetermined mark for detecting synchronization in the type of X-line, the window control unit 14 for mark detection selects the generation timing in FIG. 7 to prepare for generation only the former 16 bits and latter 16 bits (32 bits in total) around a predetermined bit "0" (refer to X (MSB) in FIG. 7) of the next window for mark detection, because if the predetermined mark for detecting synchronization is detected in the type of X-line, the next predetermined mark for detecting synchronization must be detected at the position of a predetermined bit "0" when the data deviation is not generated.

In more practical, when the predetermined mark for detecting synchronization is detected in the type of X-line, as the selection of generation timing, the window for mark detection opens, for detection of the ○-line, as illustrated in FIG. 7, to detect the heading mark of the predetermined mark for detecting synchronization with the bits of "−13", "−9", "−5", "−1", "3", "7", "11" and "15". Moreover, for detection of the Δ-line, the window for mark detection opens to detect the heading mark of the predetermined mark for detection synchronization with the bits "−14", "−10", "−6", "−2", "2", "6", "10" and "14". Moreover, for detection of the □-line, the window for mark detection opens to detect the heading mark of the predetermined mark for detecting synchronization with the bits "−15", "−11", "−7", "−3", "1", "5", "9" and "13". Moreover, for detection of the X-line, the window for mark detection opens to detect the heading mark of the predetermined mark for detecting synchronization with the bits "−16", "−12", "−8", "−4", "0", "4", "8", "12" and "16".

Moreover, the mark detecting unit 11 outputs the detection signal indicating existence of the predetermined mark for detecting synchronization to the detection line memory 12 by detecting whether a pattern of the predetermined mark for detecting synchronization (for example, data SYn for synchronous signal or the like) matches with each bit or not. The detection line memory 12 outputs the detection signal to the mark-interval counter 13, window control unit 14 for mark detection and data selecting unit 15.

The window control unit 14 for mark detection changes the timing to generate the next window for mark detection at the former 16 bits and latter 16 bits (32 bits in total) around the bit "0" (refer to FIG. 4 to FIG. 7) depending on that in which type of the four lines of the ○-line/Δ-line/□-line/X-line the mark detecting unit 11 has detected the predetermined mark for detecting synchronization. As explained above, since the window control unit 14 for mark detection generates the window for mark detection only at the former 16 bits and latter 16 bits (32 bits in total) around a predetermined bit "0", (refer to FIG. 4 to FIG. 7), the generation timing can be changed for the type of each line of the ○-line/Δ-line/□-line/X-line and thereby the detection range can also be changed for each line.

As explained above, the window control unit 14 for mark detection selects the generation timing of the predetermined mark for detecting synchronization in the respective mark detecting unit 11 based on the predetermined mark for detecting synchronization detected with the mark detecting unit 11. Therefore, the predetermined mark detecting window can be generated in the adequate timing for detecting the next predetermined mark for detecting synchronization after detecting the predetermined mark for detecting synchronization.

Moreover, since the detecting line memory 12 stores the mark detecting unit 11 that has detected the data demodulation of the audio data or video data existing between the predetermined marks for detecting synchronization after detection of the predetermined mark for detecting synchronization, the data selecting unit 15 can detect the audio data or video data following the predetermined marks for detecting synchronization by selecting the data following the line where the predetermined marks are detected as the audio data or video data and thereby the data demodulating unit 16 can demodulate the audio data or video data existing between the predetermined marks for detecting synchronization.

According to the data processor 1 explained above in detail, there are provided a controller unit 5 (receiving unit) for receiving the parallel data in a plurality of bits, a mark detecting unit 11 (detecting unit) for detecting predetermined marks for detecting synchronization to establish synchronization of data from the parallel data received with the controller unit 5, a detection line memory 12 (detection line memory unit) for storing the detection line based on the detected predetermined marks for detecting synchronization and a window control unit 14 for mark detection (generation timing selecting unit) for selecting the generation timing of the window for detecting the predetermined marks. Then, based on the detection line stored in the detection line memory 12, the window control unit 14 for mark detection selects the timing for generating the window for detecting predetermined marks. In this case, the mark detecting unit 11 detects the predetermined marks for detecting synchronization in a predetermined bit width in a series of parallel receiving data and the data demodulating unit 16 demodulates the audio data or video data existing between the detected predetermined marks for detecting synchronization under the operations of the mark-interval counter 13 and data selecting unit 15.

As a method of transferring the data read from the memory medium 2 to the controller unit 5 from the read channel unit 4, in the case of the simultaneous transfer of the parallel data of a plurality of bits (for example, four bits), the same data processing capability can be acquired, for example, only with ¼ clock frequency in comparison with the clock frequency for the serial data. Moreover, it is no longer required to use the PLL circuit and the power consumption of the circuit can also be lowered. As the embodiment, a structure assuring higher flexibility is suggested with no identification of the memory medium, but a practical structure with identification of the memory medium will be suggested in the following embodiments.

Next, the DVD-ROM data reading operation in the data processor utilizing a DVD-ROM as the other embodiment will be explained with reference to FIG. 8 and FIG. 9. In this embodiment, the controller unit 19 of the data processor has a difference only in the internal structure of the controller unit 5 illustrated in FIG. 1. Therefore, this embodiment is similar to the embodiment explained above in such a point that the data paralleled in four bits in the read channel unit 4 illustrated in FIG. 1 is inputted to the controller unit 19 as the receiving unit of FIG. 8. The internal structure of the controller unit 19 will be mainly explained with addition to the explanation about above embodiment.

The controller unit 19 of the data processor illustrated in FIG. 8 processes the parallel data transferred from the read channel unit 4. The controller unit 19 is provided respectively with a shift register 20, four SYn detecting units 21 as the detecting unit, a detection line memory 22 as the detection line memory unit, an SY frame counter unit 23 as the data counting unit, a window control unit 24 for detecting SY data as the generation timing selecting unit, a DVD-ROM data line selecting unit 25 as the data selecting unit and a 8/16 demodulating unit 26 as the data demodulating unit.

Here, the shift register 20, SYn detecting unit 21, detection line memory unit 22, SY frame counter unit 23, window control unit 24 for SY detection, DVD-ROM data line selecting unit 25 and 8/16 demodulating unit 26 are structured to respectively input the clock signal to operate in synchronization with such clock signal.

In more detail, the shift register 20 is connected with the SYn detecting unit 21 and DVD-ROM data line detecting unit 25. The four-bit parallel data outputted from the shift register 20 is then respectively inputted to the four SYn detecting units 21 and DVD-ROM data line selecting unit 25. The four SYn detecting units 21 detect respectively the data of each bit of the predetermined marks for detecting synchronization in the four-bit parallel data and can also detect, like the mark detecting unit 11 explained above, any type of detection line of the ○-line/Δ-line/□-line/X-line (refer to FIG. 3).

The four SYn detecting units 21 are connected with the detection line memory 22 to input an output signal of the SYn detecting unit 21 to the detection line memory 22. The detection line memory 22 stores how exists the predetermined marks for detecting synchronization (data SYn for synchronous signal) within the parallel data of four bits, namely any type of the detection lines of the ○-line/Δ-line/□-line/X-line (refer to FIG. 3). Since the detection line memory 22 stores the detection line of the predetermined marks for detecting synchronization, the window control unit 24 for SY detection can previously detect the any type of the detection lines of the ○-line/Δ-line/□-line/X-line to be detected at the time of detecting the next predetermined mark for detecting synchronization after detection of the predetermined marks for detecting synchronization. The detection line memory 22 is connected with the SY frame counter unit 23, window control unit 24 for SY detection and DVD-ROM data line selecting unit 25. An output of the detection line memory 22 is respectively inputted to the SY frame counter unit 23, window control unit 24 for SY detection and DVD-ROM data line selecting unit 25.

The SY frame counter unit 23 is provided to count up the audio data or video data existing between two predetermined marks (data SYn for synchronous signal) for detecting synchronization. The SY frame counter unit 23 is connected with the window control unit 24 for SY detection and 8/16 demodulating unit 26. An output signal of the SY frame counter unit 23 is respectively inputted to the widow control unit 24 for SY detection and 8/16 demodulating unit 26.

The widow control unit 24 for SY detection opens the window for detection in the SYn detecting unit 21 to control the detecting operation of the next predetermined mark for detecting synchronization (data SYn for synchronous signal) and uses the SYn detecting unit 21 for the detection and selects the generation timing of the window for detecting the predetermined marks based on the predetermined marks for detecting synchronization (data SYn for synchronous data) stored in the detection line memory 22. The window control unit 24 for SY detection is connected to the four SYn detecting units 21. An output signal of these window control units 24 for SY detection is respectively inputted to the four SYn detecting units 21. The 8/16 demodulating unit 26 demodulates the data in the demodulation timing based on the data counted up with the SY frame counter unit 23 under the control of the DVD-ROM data line selecting unit 25.

The DVD-ROM data line selecting unit 25 is provided to select the audio data or video data or the like based on the operation for detecting the predetermined marks for detecting synchronization. The DVD-ROM data line selecting unit 25 is connected with the 8/16 demodulating unit 26. An output signal of the DVD-ROM data line selecting unit 25 is inputted to the 8/16 demodulating unit 26. The 8/16 demodulating unit 26 demodulates the data in the demodulation timing based on the audio data or video data or the like counted up with the SY frame counter unit 23 under the control of the DVD-ROM data line selecting unit 25.

The shift register 20 has the storing areas of 16 stages in the width of four bits to store the 64 bits in total. Therefore, the parallel data of four bits is stored sequentially in the shift register 20 having the width of four bits from the read channel unit 4. In the case of shifting the data within the shift register 20 in such a form as being synchronized with the clock signal, the input audio data or video data or the like is also shifted in addition to the predetermined marks for detecting synchronization to be inputted to establish synchronization of data.

As illustrated in FIG. 8, the SYn detecting units 21 for detecting predetermined marks for detecting synchronization provided as many as the number of bits of the paralleled data can discriminate, like the mark detecting unit 11, all of the four types of lines (o-line/Δ-line/□-line/X-line) when the data is inputted in the total of four lines synchronized with the clock from the flip-flop FF(0) to the flip-flop FF(n) of four bits in the shift register 20 and therefore if the data is inputted in any condition, the predetermined marks for detecting synchronization (data SYn for synchronous signal) can be detected.

In more practical, the predetermined marks for detecting synchronization (data SYn for synchronous data) is inserted and allocated between the data of 91 bytes as illustrated in FIG. 9 and is formed of eight kinds of predetermined marks for detecting synchronization SY0 to SY7 (indicated typically as the data SYn for synchronous signal) in the total bit length of 32 bits.

In this case, the predetermined marks for detecting synchronization (data SYn for synchronous signal) and the break point of the audio data or video data can be discriminated depending on that in which unit of the four mark detecting units 21 the predetermined mark for detecting synchronization (data SYn for synchronous data) has been detected on the occasion of detecting the predetermined marks for detecting synchronization (data SYn for synchronous signal) in every line. Moreover, when the mark detecting unit 21 has detected the predetermined marks for detecting synchronization (data SYn for synchronous data), the detection line memory 22 stores that what predetermined marks for detecting synchronization exist in the parallel data of four bits, namely that any type of detection line is detected in the o-line/Δ-line/□-line/X-line (refer to FIG. 3). Since the detection line memory 22 detects the detection line, the DVD-ROM data line selecting unit 25 can select the line of the audio data or video data or the like existing between the predetermined marks for detecting synchronization.

Moreover, on the occasion of generating the window for detecting the next predetermined mark for detecting synchronization (SYn data for synchronous signal), the window control unit 24 for SY detection utilizes the information detected with the SYn detecting unit 21 and stored with the detection line memory 22. Namely, in regard to the position of the next predetermined mark for detecting synchronization (data SYn for synchronous signal) of the current predetermined marks for detecting synchronization (data SYn for synchronous data), 91 bytes are left between the data for synchronous signal SYn. Therefore, the position of 91 bytes after detection of the data for synchronous signal SYn with the SY frame counter unit 23 can be estimated with addition of the counted value of the length of the data SYn for synchronous signal using the clock synchronized with the data.

In general, when data is read from the DVD-ROM, even if a constant bit deviation is generated, re-synchronization of data is necessary by detecting the predetermined marks for detecting synchronization (data for synchronous signal SYn). Therefore, the window control unit 24 for SY detection generates the window for allowing detection as many as equal plus/minus bit width (or the same bytes) from the estimated position (a predetermined bit "0" (refer to FIG. 4 to FIG. 7)) in order to widen the detection range.

Here, the window is generated around the estimated position (a predetermined bit "0" (refer to FIG. 4 to FIG. 7) in order to prevent erroneous operation due to such erroneous detection of the predetermined marks for detecting synchronization (data for synchronous signal SYn) because the window is uselessly generated and thereby such predetermined mark for detecting synchronization is often detected erroneously at the area where such predetermined marks for detecting synchronization shall not exist.

Figure 18:
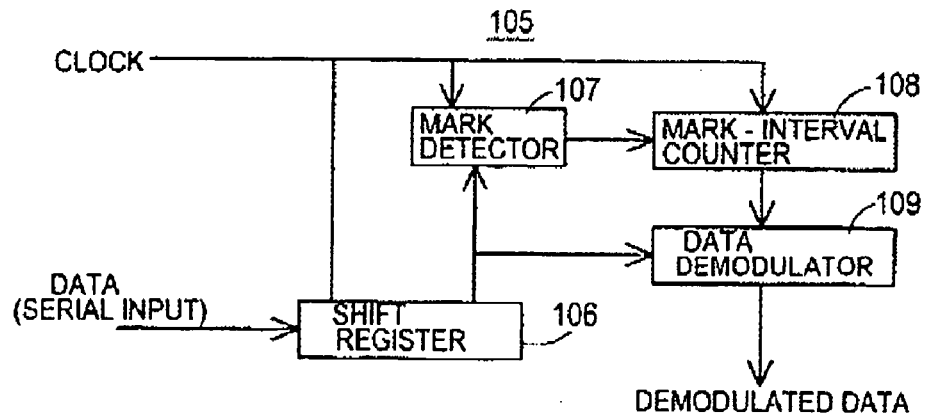
FIG. 18 is a diagram illustrating a structure in the controller of the related art for processing the serial data transferred from the read channel unit.

In the apparatus illustrated in FIG. 18, the data have been processed as the serial data on the occasion of detecting the predetermined mark for detecting synchronization. Therefore, it is enough to introduce a method to determine the generation timing in unit of bits (namely, same as the unit of clock) simply for the timing of the estimated position of the next predetermined mark for detecting synchronization (data for synchronous signal SYn) and therefore it is also enough to introduce a kind of ON/OFF timing of the detected window.

However, in this embodiment, the SYn detecting unit 21 detects the predetermined mark for detecting synchronization (data for synchronous signal SYn) from the data output as the parallel data from the shift register 20. Therefore, the window control unit 24 for SY detection selects the generation window for detection window based on the data stored in the detection line memory 22 in order to detect, as illustrated in FIG. 4 to FIG. 7, the next predetermined mark for detecting synchronization (data for synchronous signal SYn) for every detection line (four kinds of the o-line/Δ-line/□-line/X-line) of predetermined mark for the detecting synchronization (data for synchronous signal SYn). With this selection, the window control unit 24 for SY detection can generate the accurate window width of the same plus and minus widths from the estimated position (a predetermined bit "0" (refer to FIG. 4 to FIG. 7)) of the next predetermined mark for detecting synchronization (data for synchronous signal SYn).

On the occasion of demodulating the data, the line selection of the data to be demodulated indicates in direct the break point of the data existing between the paralleled predetermined mark for detecting synchronization and the audio data or video data and therefore the audio data or video data of such line is transmitted to the 8/16 demodulating unit 26. Regarding the setting of the demodulation timing in this case, the SY frame counter unit 23 is once preset in the timing of detecting the predetermined mark for detecting synchronization (data for synchronous signal SYn) and thereafter since the counting is conducted in synchronization with the clock signal, the demodulation timing can be generated from such counted value as in the case of FIG. 20.

According to the data processor 1 explained above in detail, there are provided the controller unit 19 (receiving unit) for receiving the data of DVD-ROM in a plurality of bits in the parallel condition, the SY detecting unit 21 (detecting unit) for detecting the predetermined mark for detecting synchronization (data for synchronous signal SYn) to establish the synchronization from the parallel data of DVD-ROM received with the controller unit 19, the detection line memory 22 (detection line memory unit) for storing the detection line based on the detected predetermined mark for detecting synchronization and the window control unit 24 for SY detection (generation timing selecting unit) for selecting the generation timing of the window for detecting predetermined mark. The SYn detecting unit 21 can detect the predetermined mark for detecting synchronization (data for synchronous signal SYn) without conversion to the serial data of the parallel four-bit data of DVD-ROM. Moreover, the SY detection window control unit 24 selects the generation timing of the window for detecting predetermined mark based on the detection line stored in the detection line memory 22. In this case, the SY detecting unit 21 detects the predetermined mark for detecting synchronization with a predetermined bit width in the series of data received in the parallel condition, while the 8/16 demodulating unit 26 demodulates, under the operations of the SY frame counter unit 23 and DVD-ROM data line selecting unit 25, the audio data or video data existing between the detected predetermined marks for detecting synchronization.

Therefore, in the case where the data paralleled in a plurality of bits (for example, four bits) are simultaneously transferred as a method of transferring the data read from the memory medium 2 to the controller unit 19 from the read channel unit 4, the same data processing capability can be acquired only with the 1/4 clock frequency, for example, in comparison with that in the serial data. Moreover, it is no longer required to use the PLL circuit and thereby the power consumption of the circuit can also be suppressed.

Next, as the other embodiment, the read operation of the magneto-optical data (hereinafter referred only as MO) by the data processor utilizing an MO disc as the memory medium will be explained with reference to FIG. 10 and FIG. 11. In this embodiment, the controller unit 29 of the data processor is different in the internal structure of the controller unit 5 of FIG. 1 and in the number of bits from the parallel data in the read channel unit 4 of FIG. 1. In this case, the data is paralleled to the data of two bits in the read channel unit 4 illustrated in FIG. 1 and such data is then inputted to the controller unit 29 as the receiving unit.

Hereinafter, the internal structure of the controller unit 29 will be mainly explained. In this case, contents of the above explanation of this embodiment will be additionally considered as required and the same explanation will be omitted here. However, in the case of MO, the dual PLL system, namely the system wherein data read from the MO is classified for the rising time and falling time respectively and the clocks synchronized with each data thereof are inputted is employed. Therefore, the case where the dual PLL system is used in this embodiment will be explained.

When this MO disc is used, since the input data is assumed to be paralleled in two bits, two kinds of predetermined marks for detecting synchronization SYNC or RESYNC (the other address mark (AM) also exists but it is omitted here) are used. The data used for the MO disc is divided to P-data/N-data and the SYNC or RESYNC detecting unit 31 is used as the detecting unit respectively for these data. However, there is no difference in the P-data and N-data as the operation to detect the predetermined mark for detecting synchronization and therefore only the P-data will be explained as the typical data and explanation about the N-data is omitted here.

The controller unit 29 of the data processor of FIG. 10 is used to process the parallel data transferred from the read channel unit 4 (refer to FIG. 1). This controller unit 29 is provided with a shift register 30, two SYNC or RESYNC detecting units 31, a detection line memory 32 as the detection line storing unit, a mark-interval counter unit 33 as the data counting unit, a window control unit 34 for detecting SYNC or RESYNC as the generation timing selecting unit, an MO data selecting unit 35 as the data selecting unit, an MO data merge processing unit 36 and an RLL (1, 7) demodulating unit 37 as the data demodulating unit.

The shift register 30, SYNC or RESYNC detecting unit 31, detection line memory 32, mark-interval counter unit 33, window control unit 34 for detecting SYNC or RESYNC, MO data selecting unit 35, MO data merge processing unit 36 and RLL (1, 7) demodulating unit 37 respectively receives the clock signal input to operate in synchronization with this clock signal.

In more detail, the shift register 30 is connected to the SYNC or RESYNC detecting unit 31 and MO data selecting unit 35. The parallel data of two bits outputted from the shift register 30 is then inputted respectively to the two SYNC or RESYNC detecting units 31 and MO data selecting unit 35. Two SYNC or RESYNC detecting units 31 are provided to respectively detect the data of each bit of the predetermined mark for detecting synchronization in the two bits parallel data and can detect any type of the detection line of the ○-line/Δ-line (refer to FIG. 11).

The two SYNC or RESYNC detecting units 31 are connected with the detection line memory 32. An output signal of the SYNC or RESYNC detecting unit 31 is then inputted to the detection line memory 32. The detection line memory 32 stores how exists the predetermined mark for detecting synchronization (SYNC or RESYNC or the like) within the 2-bit parallel data, namely any type of the detection line among the ○-line/Δ-line (refer to FIG. 3). Since the detection line memory 32 stores the detection line of the predetermined mark for detecting synchronization, the window control unit 34 for detecting SYNC or RESYNC can previously detect any type of the detection line among the ○-line/Δ-line to be detected on the occasion of detecting the next predetermined mark for detecting synchronization after detecting the current predetermined mark for detecting synchronization. The detection line memory 32 is connected to the mark-interval counter unit 33, window control unit 34 for detecting SYNC or RESYNC and MO data selecting unit 35. An output signal of the detection line memory 32 is respectively inputted to the mark-interval counter unit 33, window control unit 34 for detecting SYNC or RESYNC and the MO data selecting unit 35.

The mark-interval counter unit 33 is provided to count up the data such as audio data or video data existing between two predetermined marks for detecting synchronization (SYNC and RESYNC or the like). The mark-interval counter unit 33 is connected to the window control unit 34 for detecting SYNC or RESYNC and MO data merge processing unit 36. An output signal of the mark-interval counter unit 33 is respectively inputted to the window control unit 34 for detecting SYNC or RESYNC and MO data merge processing unit 36.

The window control unit 34 for detecting SYNC or RESYNC is provided to control the operation for detecting the next predetermined mark for detecting synchronization (SYNC or RESYNC) by opening the detection window in the SYNC or RESYNC detecting unit 31. The SYNC or RESYNC detecting unit 31 detects the predetermined mark for detecting synchronization (SYNC or RESYNC), while the window control unit 34 for detecting SYNC or RESYNC selects the timing for generating the window for detecting predetermined mark based on the predetermined mark for detecting synchronization (SYNC or RESYNC or the like) stored in the detection line memory 32. The window control unit 34 for detecting SYNC or RESYNC is connected to two SYNC or RESYNC detecting units 31. An output signal of the window control unit 34 for detecting SYNC or RESYNC is respectively inputted to two SYNC or RESYNC detecting units 31.

The MO data selecting unit 35 is provided to select the data based on the predetermined mark for detecting synchronization (SYNC or RESYNC or the like). The MO data selecting unit 35 is connected to the MO data merge processing unit 36. An output of the MO data selecting unit 35 is then inputted to the MO data merge processing unit 36. The MO data merge processing unit 36 executes the preprocessing to demodulate the data in combination of the data divided to the P-data/N-data. The MO data merge processing unit 36 is connected to the mark-interval counter unit 33 and MO data selecting unit 35 for the P-data and is also connected to the mark-interval counter unit 33 and MO data selecting unit 35 for the N-data. The RLL (1, 7) demodulating unit 37 which receives as an input the output signal of the mark-interval counter unit 33 and MO data selecting unit 35 for the P-data and N-data is connected to the MO data merge processing unit 36 and demodulates the data in the demodulation timing based on the data processed with the MO data merge processing unit 36.

The data divided to the P-data/N-data is converted to the parallel data of 2-bit and is then inputted to the shift register 30. This shift register 30 has the storing areas of 24 stages in the 2-bit width and can store, as illustrated in FIG. 11, the data of 48 bits in total. In this case, the parallel data of 2-bit is then sequentially inputted to the shift register having the 2-bit width from the read channel unit 4. In the case of shifting the data in the shift register 30 in the condition being synchronized with the clock signal, the input audio data or video data or the like is also shifted in addition to the predetermined mark for detecting synchronization to be inputted to establish synchronization of data.

The shift register 30 has a structure, as illustrated in FIG. 11, to connect in series 24 circuits of the flip-flop FF (0) to flip-flop FF(n) of 2-bit (in this case, n is 23). Two data transfer lines are individually connected between two flip-fop circuits FF(n−1) and flip-flop FF(n) connected in series. Thereby, the data that is inputted to the flip-flop FF(0) and stored therein is then inputted to the next flip-flop FF(1) in the timing that the next synchronous signal is inputted. In the same manner, the data stored in the flip-flop (n−1) is then subsequently inputted to the next flip-flop FF(n) in the timing that the next synchronous signal is inputted.

In this case, the data of MSB of the flip-flop FF(0) can be inputted to MSB of the next flip-flop FF(1) in the timing that the synchronous signal is inputted and therefore the data of LSB of the flip-flop FF(0) can also be inputted to LSB of the next flip-flop FF(1).

When the data for predetermined mark for detecting synchronization is equal to the even number times of two (2) (for example, 24 bits), the data for predetermined mark for detecting synchronization is stored to allocate two circles (○) in the flip-flop FF(1) to flip-flop FF(n−1) in the case where the data for predetermined mark for detecting synchronization is stored to allocate two circles in the flip-flop FF(0) of 2-bit as illustrated in FIG. 11. In this case, the circles of data for predetermined mark for detecting synchronization are allocated as explained above and therefore this allocation is called the ○-line.

However, when only one triangle (Δ) of the data for predetermined mark for detecting synchronization is allocated in the MSB in the flip-flop FF(0) of 2-bit, the two triangles are allocated for the flip-flop FF(1) to flip-flop FF(n−1). However, only one triangle (Δ) of the data for predetermined mark for detecting synchronization is stored in the LSB of the flip-flop FF(n). In this case, the triangles of the data for predetermined mark for detecting synchronization are allocated as explained above and therefore this allocation is called the Δ-line.

As illustrated in FIG. 10, the SYNC or RESYNC detecting units 31 for detecting synchronization provided as many as the number of bits of the parallel data can discriminate all of two types (○-line/Δ-line) as in the case of the mark detecting unit 11 when the data is inputted in the form of two lines in total synchronized with the clock from the flip-flop FF(0) to flip-flop FF(n) of 2-bit in the shift register 30. Therefore, if the data is inputted in any condition, the predetermined mark for detecting synchronization (SYNC and RESYNC or the like) can be detected.

The reason why this structure is introduced is that when the parallel data is inputted in two lines synchronized with the clock signal from the shift register 30 of FIG. 11, the SYNC or RESYNC detecting units 31 provided as many as the number of bits of the parallel data can discriminate all of two lines (○-line/Δ-line) and therefore the predetermined mark for detecting synchronization (SYNC and RESYNC or the like) can be detected even when it appears in any line. Even when the SYNC or RESYNC detecting unit 31 can detect in any type the SYNC/RESYNC data, the break point between the SYNC/RESYNC and between the audio data and video data can be discriminated.

Moreover, in view of preventing erroneous detection of the predetermined mark for detecting synchronization, the window control unit 34 for detecting SYNC or RESYNC opens the detection window for SYNC or RESYNC detecting unit 31 only for the area where is assumed to allowing existence of SYNC or RESYNC or the like. In this case, the window control unit 34 for detecting SYNC or RESYNC controls to open the detection window in the SYNC or RESYNC detecting unit 31 only for the equal former and latter 12 bits. Since the SYNC or RESYNC detecting unit 31 detects the predetermined mark for detecting synchronization with a predetermined bit width (each 12 bits for the former and latter areas) in the series of data received in the parallel condition, when the SYNC or RESYNC or the like is in a predetermined bit with, these data can be surely detected.

In this case, since the detection line memory 32 stores which detecting unit 31 (○-line/Δ-line) among two SYNC or RESYNC detecting units 31 has detected the predetermined mark for detecting synchronization, the window control unit 34 for detecting SYNC or RESYNC can select the generation timing of the window for detecting predetermined mark for detecting synchronization based on the stored detection line.

For example, when the SYNC ore RESYNC detecting unit 31 has detected the predetermined mark for detecting synchronization in the type of ○-line, the window control unit 34 for detecting SYNC or RESYNC selects the generation timing of FIG. 12 as the preparation for generation of only equal former and latter 12 bits (24 bits in total) around a predetermined bit "0" (refer to ○ (LSB) of FIG. 12) of the next window for mark detection, because if the predetermined mark for detecting synchronization is detected in the type of ○-line, the next predetermined mark for detecting synchronization must be detected at the position of a predetermined bit "0" if data deviation is not generated.

In more practical, when the predetermined mark for detecting synchronization is detected in the type of ○-line, as the selection of the generation timing, the window for mark detection opens, for detection of the ○-line as illustrated in FIG. 12, to detect the heading mark of the predetermined marks for detecting synchronization with the bits "−12", "−10", "−8,", "−6 ", "−4", "−2", "0", "2", "4", "6", "8", "10" and "12". Moreover, for detection of the Δ-line, the window for mark detection opens to detect the heading mark of the predetermined marks for detecting synchronization with the bits "−11", "−9", "−7", "−5", "−3", "−1", "1", "3", "5", "7", "9" and "11".

Moreover, when the SYNC or RESYNC detecting unit 31 has detected the predetermined mark for detecting synchronization in the type of the Δ-line, the window control unit 34 for detecting SYNC or RESYNC selects the generation timing of FIG. 13 to prepare for generating the next window for mark detection only for equal former and latter 12 bits (24 bits in total around a predetermined bit "0" (refer to Δ of FIG. 13), because when the predetermined mark for detecting synchronization is detected in the type of the Δ-line, the next predetermined mark for detecting synchronization must be detected at the position of a predetermined bit "0", if data deviation is not generated.

In more practical, when the predetermined mark for detecting synchronization is detected in the type of the Δ-line, as the selection of the generation timing, the window for mark detection opens, for detection of the ○-line as illustrated in FIG. 13, to detect the heading mark of the predetermined marks for detecting synchronization with the bits "−11", "−9", "−7", "−5", "−3", "−1", "1", "3", "5", "7", "9" and "11". Moreover, for detection of the Δ-data, the window for mark detection opens to detect the heading mark of the predetermined marks for detecting synchronization with the bits "−12", "−10", "−8", "−6", "−4", "−2", "0", "2", "4", "6", "8", "10" and "12".

The SYNC or RESYNC detecting unit 31 outputs the detecting signal indicating existence of SYNC or RESYNC to the detection line memory 32 by detecting whether the pattern of SYNC or RESYNC is matched or not through comparison of each bit thereof. The detection line memory 32 respectively outputs the detecting signal indicating SYNC or RESYNC to the mark-interval counter unit 33, window control unit 34 for detecting SYNC or RESYNC and MO data selecting unit 35.

For generation of the next RESYNC detection window, the information stored in the detection line memory 32 is used. In more practical, an interval of 20 bytes (in this embodiment, a format corresponding to 512 bytes, 4-fold density of the 3.5-inch) is provided between the SYNC and RESYNC data or between RESYNC and RESYNC data. Therefore, the positions from the just preceding SYNC (or RESYNC) to the next RESYNC can be estimated as follows.

Namely, it is enough for the mark-interval counter unit 33 to count up as many as 20 bytes with addition of the RESYNC length using the clock synchronized with the data after detection of SYNC (or RESYNC). However, in the case of MO, like the DVD-ROM, even if a constant bit deviation is generated, re-synchronization of data is necessary by detecting RESYNC. The window control unit 34 for detecting SYNC or RESYNC generates the window for detecting SYNC or RESYNC that allows detection as many as the equal plus or minus bits (or equal bytes) from the estimated position (a predetermined bit "0" (refer to ○ (LSB) of FIG. 12) in order to widen the detection range.

The reason why the window is generated around the estimated position (a predetermined bit "0" (refer to ○ (LSB) of FIG. 12) is that it is necessary to prevent erroneous operation by such erroneous detection since detection of the predetermined mark for detecting synchronization (RE-SYNC) at the area where the predetermined mark for detecting synchronization shall not exist intrinsically is often erroneous detection.

Since the parallel data is used in direct in this embodiment, the window control unit 34 for detecting SYNC or RESYNC determines, as illustrated in FIG. 10, the generation timing of the RESYNC detection window for each detection line (two kinds of ○Δ lines) of SYNC/RESYNC to select the generation timing of detection window based on the data stored in the detection line memory 32.

The mark-interval counter unit 33, window control unit 34 for detecting SYNC or RESYNC and MO data selecting unit 35 respectively output the output signals to the MO data merge processing unit 36 and the MO data merge processing unit 36 also outputs the data to the RLL (1, 7) demodulating unit 37. Since the line selection of the data to be demodulated indicates in direct the break point of the parallel data as in the case of DVD-ROM, it is enough for the MO data selecting unit 35 to select the data of such line. However, in this embodiment, since the SYNC or RESYNC of the P-data and N-data are detected with the SYNC or RESYNC detecting unit 31 for P-data and N-data, the MO data merge processing unit 36 is required to execute the MO data merge process through combination of the P-data and N-data. Thereafter, the RLL (1, 7) demodulating unit 37 inputs and demodulates the data after the merging in the MO data merge processing unit 36. With such process, the parallel data of 2-bit of MO is not converted to the serial data for every P-data/N-data and the mark can also be detected.

The data processor 1 explained above in detail comprises a controller unit 29 (receiving unit) for receiving the parallel data of a plurality of bits for every P-data/N-data, a SYNC or RESYNC detecting unit 31 (detecting unit) for detecting the predetermined mark for detecting synchronization to establish the synchronization of data from the parallel data for every P-data/N-data received with the control unit 29, a detection line memory 32 (detection line storing unit) for storing the detection line based on the detected predetermined mark for detecting synchronization and a window control unit 34 for detecting SYNC or RESYNC (generation timing selecting unit) for selecting the generation timing of the window for detecting predetermined mark. The SYNC or RESYNC detecting unit 31 can detect the predetermined mark for detecting synchronization (SYNC or RESYNC) from the data of every parallel P-data/N-data of 2-bit. Moreover, the window control unit 34 for detecting SYNC or RESYNC selects the generation timing of the window for detecting predetermined mark based on the detection line stored in the detection line memory 32. In this case, the SYNC or RESYNC detecting unit 31 detects the predetermined mark for detecting synchronization with a predetermined bit width in a series of parallel data received and the RLL (1, 7) demodulating unit 37 demodulates, under the operation of the MO data selecting unit 35 and MO data merge processing unit 36, the data such as audio data or video data between the detected predetermined marks for detecting synchronization (SYNC or RESYNC).

Therefore, when the parallel data of a plurality of bits (for example, 2-bit) is transferred simultaneously as a method of transferring the data read from the memory medium 2 to the controller unit 29 from the read channel unit 4, the similar data processing capability can be acquired, for example, with ½ clock frequency in comparison with the serial data. Moreover, it is no longer required to use the PLL circuit and power consumption of the circuit can also be lowered.

In the embodiment explained above, the process for detecting the predetermined mark for detecting synchronization for the DVD-ROM and MO data has been explained. In above explanation, it has also been described in detail that the window generation timing is selected depending on the position of detector that has detected the predetermined pattern and the data such as audio data or video data is synchronized.

For example, in the case of DVD-ROM, length of the predetermined mark for detecting synchronization (data for synchronous signal SYn) is 32 bits and the data length of audio data or video data is 16 bits. Therefore, the controller unit 19 for processing parallel data of four bits is introduced. Moreover, in the case of MO, since the length of the predetermined mark for detecting synchronization (SYNC) is 48 bits and the length of RESYNC or audio data or video data is 12 bits, the controller unit 29 of the data processor for processing the parallel data of 2-bit is introduced.

The reason why such structure has been introduced is that the length of the predetermined mark for detecting synchronization and audio data or video data to be demodulated must be divided with the number of bits of the parallel data. This length of data is the limitation for design.

However, such limitation on the design is not the essential problem and such problem can be solved by introducing, for example, the controller unit 39 illustrated in FIG. 15 in the data processor. Namely, even when length of the predetermined mark for detecting synchronization and audio data or video data to be demodulated is not divided with the number of bits of the paralleled data, the data processor can be operated. Such operation will be explained as the other embodiment but such explanation will be omitted by introducing the contents of above embodiment. However, since the number of bits of the data paralleled in the read channel unit 4 of FIG. 1 is different from that in the embodiment explained above, the data is converted to the parallel data of 3-bit with the read channel unit 4 of FIG. 1 and this data is then inputted to the controller unit 39 as the receiving unit.

The controller unit 39 of the data processor illustrated in FIG. 15 is provided to process the parallel data transferred from the read channel unit 4. This controller unit 39 is provided with a shift register 40, three mark detecting units 41 as the detecting unit, a detection line memory 42 as the detection line memory unit, a mark-interval counter unit 43 as the data counting unit, a window control unit 44 for mark detection as the generation timing selecting unit, a data selecting unit 45 as the data selecting unit, a detection line control unit 46 and a data demodulating unit 47 as the data demodulating unit. The shift register 40, mark detecting unit 41, detection line memory 42, mark-interval counter unit 43, window control unit 44 for mark detection, data selecting unit 45, detection line control unit 46 and data demodulating unit 47 receive the clock signal as an input signal and operate in synchronization with this clock signal.

In more detail, the shift register 40 is connected to the mark detecting unit 41 and data selecting unit 45. The paralleled data of 3-bit outputted from the shift register 40 is then inputted respectively to the three mark detecting units 41 and data selecting unit 45. The three mark detecting units 41 is provided respectively to detect the data of each bit of the predetermined mark for detecting synchronization in the paralleled data of 3-bit and can detect the predetermined mark for detecting synchronization in any type of the ○-line/Δ-line/□-line (refer to FIG. 16) explained later. In this case, ○/Δ/□ indicate contents of 1-bit in the data.

The three mark detecting units 41 are connected with the detection line memory 42 to input an output signal of the mark detecting unit 41 to the detection line memory 42. The detection line memory 42 stores how exists the predetermined mark for detecting synchronization within the parallel data of 3-bit, namely the type of the detection line among the ○-line/Δ-line/□-line (refer to FIG. 16). Since the detection line memory 42 stores the detection line of the predetermined mark for detecting synchronization, the window control unit 44 for mark detection takes a proper measure by previously detecting the type of line among the ○-line/Δ-line/□-line to be detected on the occasion of detecting the next predetermined mark for detecting synchronization after detection of the current predetermined mark for detecting synchronization. The detection line memory 42 is connected to the mark-interval counter unit 43, window control unit 44 for mark detection and the detection line control unit 46. An output signal of the detection line memory 42 is respectively inputted to the mark-interval counter unit 43, window control unit 44 for mark detection and detection line control unit 46.

The mark-interval counter unit 43 is provided to count the audio data or video data existing between two predetermined marks for detecting synchronization and can estimate the position of the predetermined mark for detecting synchronization appearing after the audio data or video data based on the counted value of the audio data or video data after detection of the predetermined mark for detecting synchronization. The mark-interval counter unit 43 is connected with the window control unit 44 for mark detection, detection line control unit 46 and data demodulating unit 47. An output signal of the mark-interval counter unit 43 is respectively inputted to the window control unit 44 for mark detection, detection line control unit 46 and data demodulating unit 47.

The window control unit 44 for mark detection opens the window for detection in the mark detecting unit 41 to control the detecting operation of the next predetermined mark for detecting synchronization. This window control unit 44 detects the predetermined mark using the mark detecting unit 41 and then selects the generation timing of the window for detecting predetermined mark based on the predetermined mark for detecting synchronization stored in the detection line memory 42. Therefore, the window control unit 44 for mark detection is connected to the three mark detecting units 41 and inputs the output signal of such window 44 for detection to the three mark detecting units 41 respectively. When the three mark detecting units 41 detect the predetermined mark for detecting synchronization, the bread point between the predetermined mark for detecting synchronization and the audio data or video data can be discriminated depending on that in any detecting unit among three mark detecting units 41 the predetermined mark for detecting synchronization has been detected.

The data selecting unit 45 is provided to select the audio data or video data in order to demodulate the data based on the operation to detect the predetermined mark for detecting synchronization. In this case, the detection line control unit 46 can adequately change the line of the data to be selected. The data demodulating unit 47 executes the selection process to process the paralleled data of 3-bit outputted from the shift register 40. The data selecting unit 45 is connected with the data demodulating unit 47 and an output signal of the data selecting unit 45 is inputted to the data demodulating unit 47. The data demodulating unit 47 demodulates the data in the demodulation timing based on the audio data or video data or the like counted up with the mark-interval counter unit 43 under the operation of the data selecting unit 45.

The shift register 40 can store the data in the width of 3-bit and sequentially inputs the paralleled data of 3-bit from the read channel unit 4. In the case where the data synchronized with the clock is shifted in the shift register 40, the input audio data or video data is also shifted in addition to the predetermined mark for detecting synchronization to be inputted to establish the synchronization of data.

The shift register 40 has a structure, as illustrated in FIG. 16, to connect in series the flip-flop FF(0) to flip-flop (n) of 3-bit. Between two flip-flop FF(n−1) and flip-flop FF(n) connected in series, three data transfer lines are connected individually. Thereby, the data inputted and stored to the flip-flop FF(0) is then inputted to the next flip-flop FF(1) in the timing that the next synchronous signal is inputted. In the same manner, the data inputted and stored in the flip-flop FF(n−1) is then inputted to the next flip-flop FF(n) in the timing that the next synchronous signal is inputted.

In this case, the data of MSB of the flip-flop FF(0) can be inputted to MSB of the next flip-flop FF(1) in the input timing of the synchronous signal and the data of LSB of the flip-flop FF(0) can also be inputted to LSB of the next flip-flop FF(1) and then the data other than MSB and LSB of the flip-flop FF(0) can also be inputted to the next flip-flop FF(1).

Thereby, when the data for predetermined mark for detecting synchronization is stored so that three circles (○) are allocated in the flip-flop FF(0) of 3-bit as illustrated in FIG. 16, the data for predetermined mark for detecting synchronization is stored to allocate three circles (○) even for the flip-flop FF(1) to flip-flop FF(n−2) (n is 10 when the data for predetermined mark for detecting synchronization is, for example, 32 bits). However, in the flip-flop FF(n−1), two circles (○) of the data for predetermined mark for detecting synchronization are stored in the flip-flop FF(n-1). In this case, since the 32 circles (○) of the data for predetermined mark for detecting synchronization are allocated, this allocation is called the ○-line.

However, when two triangles (Δ) of the data for predetermined mark for detecting synchronization are allocated toward LSB from MSB in the flip-flop FF(O) of 3-bit, data is stored to allocate three triangles (Δ) in the flip-flop FF(1) to flip-flop FF(n−1) (n is 10, for example, for the data of 32-bit for predetermined mark for detecting synchronization). In this case, since 32 triangles (Δ) of the data for predetermined mark for detecting synchronization are allocated, this allocation is called the Δ-line.

In the same manner, when only one square (□) of the data for predetermined mark for detecting synchronization is stored in MSB of the flip-flop FF(0) of 3-bit, the data is stored to allocate three squares (□) even in the flip-flop FF(1) to flip-flop FF(n−1) (n is 11 when the data for predetermined mark for detecting synchronization is 32 bits). However, only one square (□) of the data for predetermined mark for detecting synchronization is stored in LSB of the flip-flop FF(n). In this case, since 32 squares (□) of the data for predetermined mark for detecting synchronization are allocated, this allocation is called the □-line.

Since the three mark detecting units 41 are connected respectively to the output of the shift register 40, the mark detector 41 inputs the predetermined mark for detecting synchronization (data SYn for synchronous signal or the like, for example) under the condition synchronized with the clock from the flip-flop FF(0) to flip-flop FF(n) of 3-bit in the shift register of FIG. 15. The three mark detecting units 41 can detect in any type of the ○-line/Δ-line/□-line (refer to FIG. 16) of the paralleled data of 3-bit the predetermined mark for detecting synchronization has been inputted.

The data selecting unit 45 selects the data after detection of the predetermined mark for detecting synchronization under the control of the detection line control unit 46. In the case of the control unit 5 of this embodiment, the mark detecting unit 11 for detecting the predetermined mark for detecting synchronization and the detection line (○-line/Δ-line/□-line/X -line) are fixed but in the case of the control unit 39 of this embodiment, these are changed in unit of the audio data or video data or the like to be demodulated, considering the length of the predetermined mark for detecting synchronization and audio data or video data to be demodulated. In the case where the data of 16-bit length, for example, is paralleled in 3-bit as the audio data or video data or the like, an extra one bit is generated as a result when the data is detected with three mark detecting units 41.

Therefore, the detection line control unit 46 changes the line of data to be selected by considering, for example, the extra one bit of the data of 16-bit length. Namely, in the case where extra one bit is generated, if the mark detecting unit 41 detects the predetermined mark for detecting synchronization in the ○-line, the data selecting unit 45 executes the process to select the data of Δ-line as the next line under the control of the detection line control unit 46.

Moreover, when it is considered that the data of 32-bit length, for example, is paralleled with 3-bit and is then detected with the three mark detecting units 41, the extra bits of 2-bit are generated as a result. In this case, the detection line control unit 46 varies the line of data to be selected considering the extra bits of 2-bit in the data of 32-bit length. Namely, in the case where the extra bits of 2-bit is generated, if the mark detecting unit 41 detects the predetermined mark for detecting synchronization in the ○-line, the data selecting unit 45 executes the process to select the □-data as the next line under the control of the detection line control unit 46.

The window control unit 44 for mark detection previously calculates, at the time of generation of the window for mark detection, the extra bits between the predetermined marks for detecting synchronization depending on the relationship of the paralleled number of bits of the audio data or video data existing between the predetermined marks for detecting synchronization. Since the window control unit 44 for mark detection selects the window generation timing of the line considering the extra bits, its structure becomes almost equal to that of the window control unit 14 for mark detection illustrated in FIG. 2. The window control unit 44 for mark detection opens the window for detection in the mark detecting unit 41 based on the window generation timing of the line considering the extra bits and selects the generation timing of the window for detecting predetermined mark on the occasion of controlling the detecting operation for the next predetermined mark for detecting synchronization.

The data processor 1 explained above in detail comprises a controller unit 39 (receiving unit) for receiving the data with a plurality of parallel bits, a mark detecting unit 41 (detecting unit) for detecting the predetermined mark for detecting synchronization to establish the synchronization of data from the parallel data received with the controller unit 39, a detection line memory 42 (detection line memory unit) for storing the detection line based on the detected predetermined mark for detecting synchronization and a window control unit 44 for mark detection (generation timing selecting unit) for selecting the generation timing of the window for detecting predetermined mark. Based on the detection line stored in the detection line memory 42 and the control of the detection line control unit 46, the window control unit 44 for mark detection selects the generation timing of the window for detecting predetermined mark. In this case, the mark detecting unit 41 detects the predetermined mark for detecting synchronization in a predetermined bit width in the series of data received in the parallel condition and the data demodulating unit 47 demodulates the audio data or video data between the detected predetermined marks for detecting synchronization under the operation of the mark-interval counter unit 43, data selecting unit 45 and detection line control unit 46.

When the paralleled data are transferred simultaneously under the condition of a plurality of bits (3-bit, for example) as a method of data transfer to transfer the data read from the memory medium 2 to the controller unit 39 from the read channel unit 4, the same data processing capability can be attained only with ⅓ clock frequency, for example, in comparison with the clock frequency of the serial data. Moreover, it is no longer required to use the PLL circuit and thereby the power consumption of the circuit can also be lowered.

Here, the present invention is never limited only to the above embodiment and it of course allows various modifications or changes within the scope of the spirit of the present invention.

For example, in this embodiment, it has been explained that the controller unit 5 detects the predetermined mark for detecting synchronization for synchronization of data and demodulation of data, but the present invention is never limited thereto. For example, the read channel unit 4 may have the function of a part (or whole part) of the data synchronization. In addition, even in the case where the read channel unit 4 and controller unit 5 are accommodated in the same chip, the present invention can be utilized. Moreover, the data processor detects the predetermined mark for detecting synchronization to transfer the data read from the memory medium to the controller unit from the read channel unit and can also adapt such data to the apparatus other than the apparatus for demodulating the data existing between predetermined marks for detecting synchronization.

Moreover, as the memory media, for example, CD-ROM, DVD-R, DVD-RAM, DVD-RW may also be used in addition to MO, DVD-ROM explained above. In addition, as the data to be stored in the memory media, the data for computer or game software may be used as well as the audio data or video data and or the data to be used for the computer peripheral devices may also be allowed.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalent.

What is claimed is:

1. A data processor comprising:
    a receiving unit for receiving a series of data including only one predetermined mark for detecting synchronization and generating parallel data from the series of data; and
    a plurality of detecting units being provided at each bit position of the parallel data, the detecting units being adapted to detect whether strings of bits of the parallel data corresponding to strings of bits of the series of data from each bit position of the parallel data as a starting point of the predetermined mark are the predetermined; wherein any one of the detecting units detects the starting point of the predetermined mark.

2. A data processor according to claim 1, wherein said plurality of detecting units detect the predetermined mark for detecting synchronization in a predetermined bit width among the series of data in parallel condition.

3. A data processor according to claim 1, further comprising a generation timing selecting unit for selecting generation timing of a window for detecting the predetermined mark based on the predetermined mark for detecting synchronization.

4. A data processor according to claim 1, further comprising a data demodulating unit for demodulating the series of data between the predetermined mark for detecting synchronization based on the predetermined mark for detecting synchronization.

5. A data processor according to claim 1, further comprising a detection line memory unit for storing a detection line based on the predetermined mark for detecting synchronization.

6. A data processor according to claim 1, further comprising a data selecting unit for selecting data based on the predetermined mark for detecting synchronization.

7. A data processor according to claim 1, further comprising a data counting unit for counting the series of data between the predetermined mark for detecting synchronization based on the predetermined mark for detecting synchronization.

8. A data processor according to claim 1, wherein said receiving unit is provided with a shift register to input the plurality of parallel data connected with the detecting units in the same number as the number of parallel data.

9. A data processor according to claim 1, wherein the plurality of detecting units are provided in equal number to the number of bits constituting the parallel data.

10. A data processor for detecting only one predetermined mark for detecting synchronization that is included in a series of data read from a memory medium in order to establish synchronization at a time of transferring the series of data to a controller unit from a read channel unit, comprising:
    a receiving unit for receiving the series of data including the predetermined mark for detecting synchronization and generating parallel data from the series of data; and
    a plurality of detecting units being provided at each bit position of the parallel data, the detecting units being adapted to detect whether strings of bits of the parallel data corresponding to strings of bits of the series of data from each bit position of the parallel data as a starting point of the predetermined mark are the predetermined;
    wherein any one of the detecting units detects the starting point of the predetermined mark.

11. A data processor according to claim 10, wherein the plurality of detecting units are provided in equal number to the number of bits constituting the parallel data.

12. A data processing method comprising the following steps of:
    receiving a series of data including only one predetermined mark for detecting synchronization;
    generating a parallel data from the series of data;
    detecting the predetermined mark for detecting synchronization from any one of strings of bits of the parallel data continuing from each bit position of the parallel data to establish synchronization of the series of data; and demodulating the series of data based on the predetermined mark for detecting synchronization detected from one of the bit strings.

13. A data processing method according to claim 12, wherein the predetermined mark for detecting synchronization is detected in predetermined bit widths of the series of data in parallel condition.

14. A data processing method according to claim 12, wherein generation timing of a window for detecting predetermined mark is selected based on the detected predetermined mark for detecting synchronization.

15. A data processing method according to claim 12, wherein a detection line is stored based on the detected predetermined mark for detecting synchronization.

16. A data processing method according to claim 12, wherein data is selected based on the detected predetermined mark for detecting synchronization.

17. A data processing method according to claim 12, wherein data between the detected predetermined mark for detecting synchronization is counted up.

* * * * *